US012701485B2

(12) United States Patent
Huang et al.

(10) Patent No.: US 12,701,485 B2
(45) Date of Patent: Aug. 4, 2026

(54) METHOD AND APPARATUS FOR TRIGGERING OF FLIGHT PATH REPORTING IN A WIRELESS COMMUNICATION SYSTEM

(71) Applicant: ASUS Technology Licensing Inc., Taipei City (TW)

(72) Inventors: Yi-Hsuan Huang, Taipei City (TW); Meng-Hui Ou, Taipei City (TW)

(73) Assignee: ASUS Technology Licensing Inc., Taipei City (TW)

( * ) Notice: Subject to any disclaimer, the term of this patent is extended or adjusted under 35 U.S.C. 154(b) by 319 days.

(21) Appl. No.: 18/497,566

(22) Filed: Oct. 30, 2023

(65) Prior Publication Data

US 2024/0147337 A1    May 2, 2024

Related U.S. Application Data

(60) Provisional application No. 63/421,452, filed on Nov. 1, 2022.

(51) Int. Cl.
H04W 36/32      (2009.01)
H04W 76/20      (2018.01)

(52) U.S. Cl.
CPC ....... H04W 36/326 (2023.05); H04W 36/322 (2023.05); H04W 76/20 (2018.02)

(58) Field of Classification Search
CPC . H04W 16/26; H04W 36/324; H04W 36/362; H04W 84/06; H04W 64/006;

(Continued)

(56) References Cited

U.S. PATENT DOCUMENTS 11,601,861 B2    3/2023  Hong
2017/0315706 A1*  11/2017  Helppi ..................... G08G 5/21
(Continued)

FOREIGN PATENT DOCUMENTS

CN          112088125 A     12/2020
EP            3764685 A1     1/2021
KR      1020190101332 A      8/2019

OTHER PUBLICATIONS

Office Action to the corresponding Korean patent application rendered by the Korean Intellectual Property Office (KIPO) on Oct. 13, 2025, 14 pages (including English translation).

*Primary Examiner* — Iqbal Zaidi
(74) *Attorney, Agent, or Firm* — Skaar Ulbrich Macari, P.A.

(57)            ABSTRACT

Methods, systems, and apparatuses are provided for a User Equipment (UE) in a wireless communication system comprises transmitting a first flight path report, to a network node, comprising multiple waypoints and receiving a first configuration of a distance threshold for flight path update. The method further comprises transmitting a UE assistance information including an indication of flight path available to the network node, if at least distance between previously provided location for one waypoint in the first flight path report and new location for the one waypoint is more than or equal to the distance threshold, receiving a UE information request indicating flight path request, and transmitting a second flight path report, via a UE information response, in response to receiving the UE information request.

18 Claims, 9 Drawing Sheets

(58) Field of Classification Search
CPC ......... H04W 28/0226; H04W 28/0236; H04W
40/02; H04W 36/36; G01C 21/34; G05D
1/00; B64U 2201/20
See application file for complete search history.

(56)                    References Cited

U.S. PATENT DOCUMENTS

| | | |
|---|---|---|
| 2021/0345066 A1 | 11/2021 | Hong |
| 2022/0327940 A1* | 10/2022 | Suddreth ................. G08G 5/55 |
| 2022/0404484 A1* | 12/2022 | Saha .................... G01S 13/584 |

\* cited by examiner

1000

1002

Receiving a configuration for (UE-based) flight path report comprising at least a first condition

1004

Triggering, indicating or transmitting a flight path report (or update) in response to at least the first condition is fulfilled

METHOD AND APPARATUS FOR TRIGGERING OF FLIGHT PATH REPORTING IN A WIRELESS COMMUNICATION SYSTEM

CROSS-REFERENCE TO RELATED APPLICATIONS

The present Application claims priority to and the benefit of U.S. Provisional Patent Application Ser. No. 63/421,452, filed Nov. 1, 2022, which is fully incorporated herein by reference.

FIELD

This disclosure generally relates to wireless communication networks and, more particularly, to a method and apparatus for triggering of flight path reporting in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

Methods, systems, and apparatuses are provided for triggering of flight path reporting in a wireless communication system such that a User Equipment (UE) can indicate flight path updates to a network when changing the expected flight path.

In various embodiments, a UE in a wireless communication system comprises transmitting a first flight path report, to a network node, comprising multiple waypoints, receiving a first configuration of a distance threshold for flight path update, transmitting a UE assistance information including an indication of flight path available to the network node, if at least distance difference between a previously provided location for one waypoint in the first flight path report and a new location for the one waypoint is more than or equal to the distance threshold, receiving a UE information request indicating flight path request, and transmitting a second flight path report, via a UE information response, in response to receiving the UE information request.

DETAILED DESCRIPTION

The invention described herein can be applied to or implemented in exemplary wireless communication systems and devices described below. In addition, the invention is described mainly in the context of the 3GPP architecture reference model. However, it is understood that with the disclosed information, one skilled in the art could easily adapt for use and implement aspects of the invention in a 3GPP2 network architecture as well as in other network architectures.

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A (Long Term Evolution Advanced) wireless access, 3GPP2 UMB (Ultra Mobile Broadband), WiMax, 3GPP NR (New Radio), or some other modulation techniques.

In particular, the exemplary wireless communication systems and devices described below may be designed to support one or more standards such as the standard offered by a consortium named "3rd Generation Partnership Project" referred to herein as 3GPP, including: [1] RP-213600, "WI on NR Support for UAV"; [2] 3GPP TS 36.300 V17.2.0, "E-UTRA and E-UTRAN, Overall description"; [3] 3GPP TS 36.331 V17.2.0, "E-UTRA, RRC protocol specification"; and [4] 3GPP TS 38.331 V17.2.0, "NR, RRC protocol specification". The standards and documents listed above are hereby expressly and fully incorporated herein by reference in their entirety.

Figure 1:
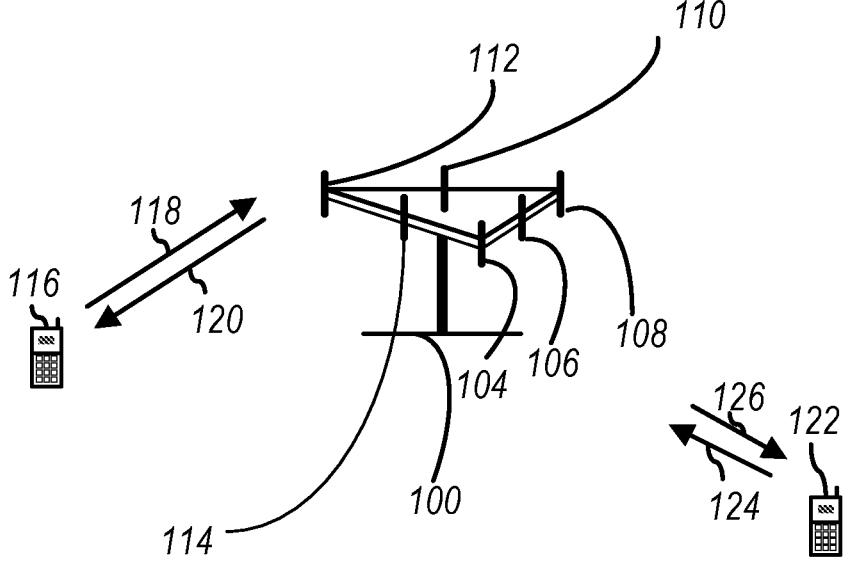
FIG. 1 shows a diagram of a wireless communication system, in accordance with embodiments of the present invention.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal (AT) 116 is in communication with antennas 112 and 114, where antennas 112 and 114 transmit information to access terminal 116 over forward link 120 and receive information from AT 116 over reverse link 118. AT 122 is in communication with antennas 106 and 108, where antennas 106 and 108 transmit information to AT 122 over forward link 126 and receive information from AT 122 over reverse link 124. In a FDD system, communication links 118, 120, 124 and 126 may use different frequency for communication. For example, forward link 120 may use a different frequency than that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage normally causes less interference to access terminals in neighboring cells than an access network transmitting through a single antenna to all its access terminals.

The AN may be a fixed station or base station used for communicating with the terminals and may also be referred to as an access point, a Node B, a base station, an enhanced base station, an eNodeB, or some other terminology. The AT may also be called User Equipment (UE), a wireless communication device, terminal, access terminal or some other terminology.

Figure 2:
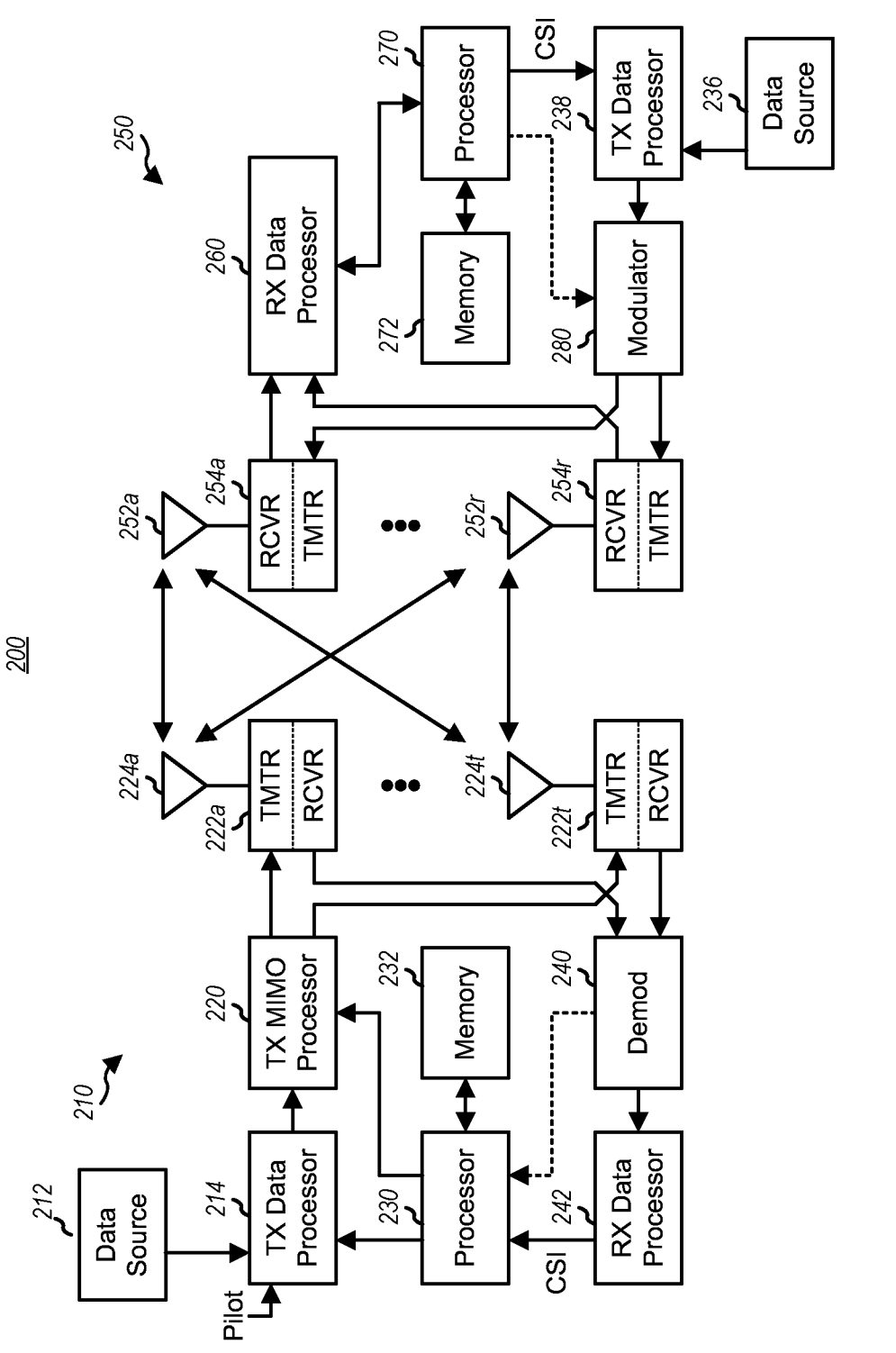
FIG. 2 is a block diagram of a transmitter system (also known as access network) and a receiver system (also known as user equipment or UE), in accordance with embodiments of the present invention.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230. A memory 232 is coupled to processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Memory 232 may be used to temporarily store some buffered/computational data from 240 or 242 through Processor 230, store some buffed data from 212, or store some specific program codes. And Memory 272 may be used to temporarily store some buffered/computational data from 260 through Processor 270, store some buffed data from 236, or store some specific program codes.

Figure 3:
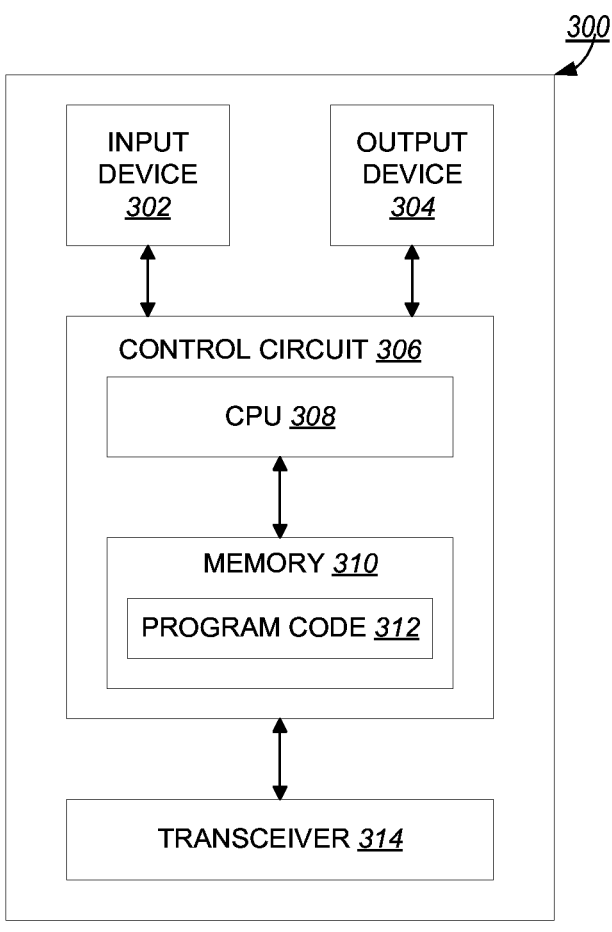
FIG. 3 is a functional block diagram of a communication system, in accordance with embodiments of the present invention.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly.

Figure 4:
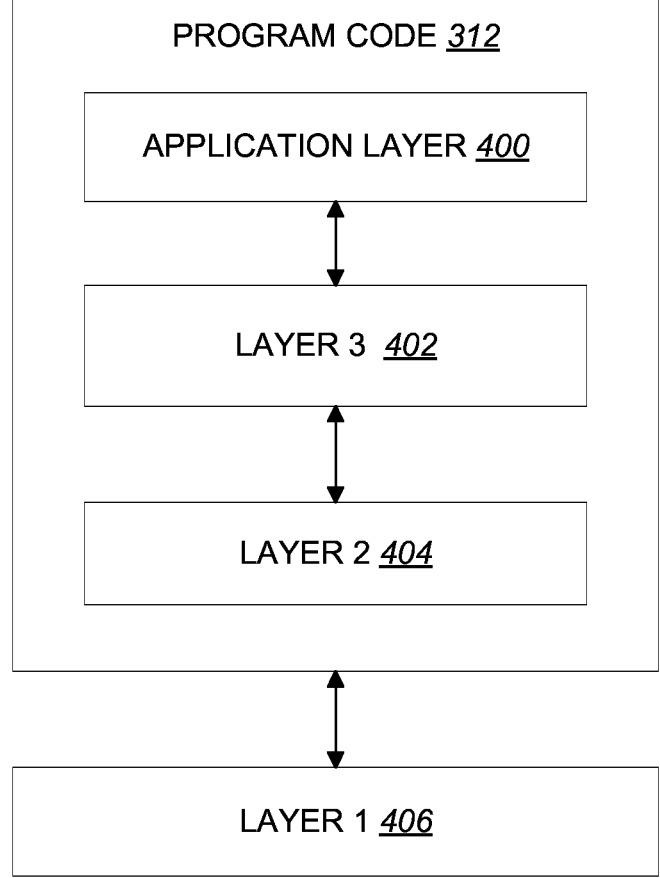
FIG. 4 is a functional block diagram of the program code of FIG. 3, in accordance with embodiments of the present invention.

FIG. 4 is a simplified block diagram of the program code 312 shown in FIG. 3 in accordance with an embodiment of the invention. In this embodiment, the program code 312 includes an application layer 400, a La 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

For LTE, LTE-A, or NR systems, the Layer 2 portion 404 may include a Radio Link Control (RLC) layer and a Medium Access Control (MAC) layer. The Layer 3 portion 402 may include a Radio Resource Control (RRC) layer.

Any two or more than two of the following paragraphs, (sub-)bullets, points, actions, or claims described in each invention paragraph or section may be combined logically, reasonably, and properly to form a specific method.

Any sentence, paragraph, (sub-)bullet, point, action, or claim described in each of the following invention paragraphs or sections may be implemented independently and separately to form a specific method or apparatus. Dependency, e.g., "based on", "more specifically", "example", etc., in the following invention disclosure is just one possible embodiment which would not restrict the specific method or apparatus.

The general description of aerial UE communication in LTE is specified in TS 36.300 ([2] 3GPP TS 36.300 V17.2.0, "E-UTRA and E-UTRAN, Overall description") as below:
Quotation Start [2]
23.17 Support for Aerial UE communication
23.17.1 General
E-UTRAN based mechanisms providing LTE connection to UEs capable of Aerial communication are supported via the following functionalities:
   subscription-based Aerial UE identification and authorization, as specified in TS 23.401 [17], clause 4.3.31.
   height reporting based on the event that the UE's altitude has crossed a network-configured reference altitude threshold.
   interference detection based on a measurement reporting that is triggered when a configured number of cells (i.e. larger than one) fulfills the triggering criteria simultaneously.
   signalling of flight path information from UE to E-UTRAN.
   Location information reporting, including UE's horizontal and vertical velocity.

Figure 5:
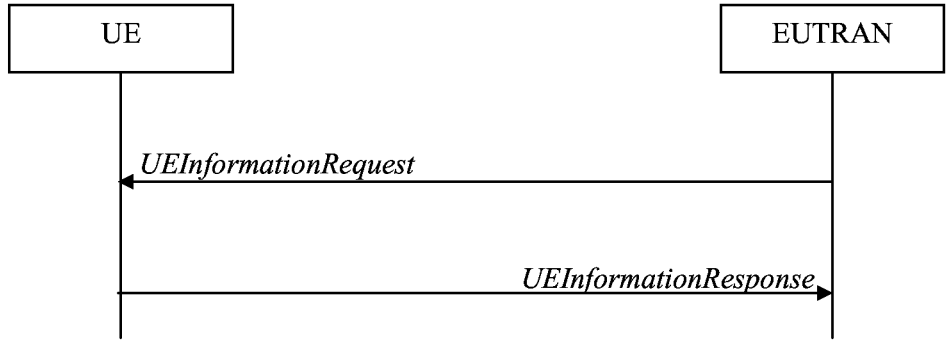
FIG. 5 is a reproduction of FIG. 5.6.5.1-1: UE information procedure, from 3GPP TS 36.331 V17.2.0, "E-UTRA, RRC protocol specification".

23.17.2 Subscription Based Identification of Aerial UE Function
Support of Aerial UE function is stored in the user's subscription information in HSS. HSS transfers this information to the MME during Attach, Service Request and Tracking Area Update procedures.
The subscription information can be provided from the MME to the eNB via the S1-AP Initial Context Setup Request during Attach, Tracking Area Update and Service Request procedures. The subscription information can also be updated via the S1-AP UE Context Modification Request message. In addition, for X2-based handover, the source eNodeB can include the subscription information in the X2-AP Handover Request message to the target eNodeB.
For the intra and inter MME S1 based handover, the MME provides the subscription information to the target eNB after the handover procedure.
23.17.3 Height Based Reporting for Aerial UE Communication
An aerial UE can be configured with event based height reporting. UE sends height report when the altitude of the aerial UE is above or below a configured threshold. The report contains height and location if configured as described in 23.17.6.
23.17.4 Interference Detection and Mitigation for Aerial UE Communication
For interference detection, an aerial UE can be configured with RRM event A3, A4 or A5 that triggers measurement report when individual (per cell) RSRP values for a configured number of cells fulfill the configured event. Once such condition is met and a measurement report is sent, the list of triggered cells is updated when subsequent cell(s) fulfil the event, however further measurement reports are not sent while the list of triggered cells remains larger than the configured number of cells. The report contains RRM results and location if configured, as described in 23.17.6.
For interference mitigation an aerial UE can be configured with a dedicated UE-specific alpha parameter for PUSCH power control.
23.17.5 Flight Path Information Reporting
E-UTRAN can request a UE to report flight path information consisting of a number of waypoints defined as 3D locations as defined in TS 36.355 [78]. A UE reports up to configured number of waypoints if flight path information is available at the UE. The report can consist also time stamps per waypoint if configured in the request and if available at the UE.
23.17.6 Location Reporting for Aerial UE Communication
Location information for Aerial UE communication can include horizontal and vertical speed if configured. Location information can be included in RRM report and in height report.
Quotation End
An aerial UE could report flight path information to NW in LTE. The related procedures and configurations are specified in TS 38.331 ([3] 3GPP TS 36.331 V17.2.0, "E-UTRA, RRC protocol specification") as below:
Quotation Start [3]
5.6.5 UE Information
5.6.5.1 General
FIG. 5 is a reproduction of FIG. 5.6.5.1-1: UE information procedure, from 3GPP TS 36.331 V17.2.0, "E-UTRA, RRC protocol specification".
The UE information procedure is used by E-UTRAN to request the UE to report information.

5.6.5.2 Initiation

E-UTRAN initiates the procedure by sending the UEInformationRequest message. E-UTRAN should initiate this procedure only after successful security activation.

5.6.5.3 Reception of the UEInformationRequest Message

Upon receiving the UEInformationRequest message, the UE shall, only after successful security activation:

1> except for NB-IoT, if flightPathInfoReq field is present and the UE has flight path information available:

2> include the flightPathInfoReport and set it to include the list of waypoints along the flight path;

2> if the includeTimeStamp is set to TRUE:

3> set the field timeStamp to the time when UE intends to arrive to each waypoint if this information is available at the UE;

Next Quotation

UEInformationRequest

The UEInformationRequest is the command used by E-UTRAN to retrieve information from the UE.

Signalling radio bearer: SRB1

RLC-SAP: AM

Logical channel: DCCH

Direction: E-UTRAN to UE

---

UEInformationRequest message

```
[...]
UEInformationRequest-v1530-IEs ::= SEQUENCE {
    idleModeMeasurementReq-r15    ENUMERATED {true}              OPTIONAL,  -- Need ON
    flightPathInfoReq-r15         FlightPathInfoReportConfig-r15 OPTIONAL,  -- Need ON
    nonCriticalExtension          UEInformationRequest-v1710-IEs OPTIONAL
}
[...]
```

---

UEInformationResponse

The UEInformationResponse message is used by the UE to transfer the information requested by the E-UTRAN.

Signalling radio bearer: SRB1 or SRB2 (when logged measurement information is included)

RLC-SAP: AM

Logical channel: DCCH

Direction: UE to E-UTRAN

---

UEInformationResponse message

```
[...]
UEInformationResponse-v1530-IEs ::=      SEQUENCE {
    measResultListIdle-r15                   MeasResultListIdle-r15              OPTIONAL,
    flightPathInfoReport-r15                 FlightPathInfoReport-r15           OPTIONAL,
    nonCriticalExtension                     UEInformationResponse-v1610-IEs     OPTIONAL
}
[...]
FlightPathInfoReport-r15 ::=             SEQUENCE {
    flightPath-r15 SEQUENCE (SIZE (1..maxWayPoint-r15)) OF WayPointLocation-r15    OPTIONAL,
    dummy                                    SEQUENCE { }                       OPTIONAL
}
WayPointLocation-r15 ::=                 SEQUENCE {
    wayPointLocation-r15                         LocationInfo-r10,
    timeStamp-r15                                AbsoluteTimeInfo-r10               OPTIONAL
}
```

---

UEInformationResponse field descriptions absoluteTimeStamp
Indicates the absolute time when the logged measurement configuration logging is provided, as indicated by E-UTRAN within absoluteTimeInfo.
timeStamp
Includes time stamps for the waypoints that describe planned locations for the UE.
wayPointLocation
Includes location coordinates for a UE for Aerial UE operation. The waypoints describe planned locations for the UE.

---

Next Quotation

LocationInfo

The IE LocationInfo is used to transfer detailed location information available at the UE to correlate measurements and UE position information.

LocationInfo information element

```
LocationInfo-r10 ::= SEQUENCE {
    locationCoordinates-r10                 CHOICE {
        ellipsoid-Point-r10                     OCTET STRING,
        ellipsoidPointWithAltitude-r10          OCTET STRING,
    ...,
        ellipsoidPointWithUncertaintyCircle-r11                        OCTET STRING,
        ellipsoidPointWithUncertaintyEllipse-r11                       OCTET STRING,
        ellipsoidPointWithAltitudeAndUncertaintyEllipsoid-r11          OCTET STRING,
        ellipsoidArc-r11                                               OCTET STRING,
        polygon-r11                                                    OCTET STRING
    },
    horizontalVelocity-r10                  OCTET STRING    OPTIONAL,
    gnss-TOD-msec-r10                       OCTET STRING    OPTIONAL,
    ...,
    verticalVelocityInfo-r15       CHOICE {
        verticalVelocity-r15                    OCTET STRING,
        verticalVelocityAndUncertainty-r15      OCTET STRING
    }        OPTIONAL
}
```

20

LocationInfo field descriptions ellipsoidArc
Parameter EllipsoidArc defined in TS 36.355 [54]. The first/leftmost bit of the first octet contains the most significant bit.
ellipsoid-Point
Parameter Ellipsoid-Point defined in TS 36.355 [54]. The first/leftmost bit of the first octet contains the most significant bit.
ellipsoidPointWithAltitude
Parameter EllipsoidPointWithAltitude defined in TS 36.355 [54]. The first/leftmost bit of the first octet contains the most significant bit.
ellipsoidPointWithAltitudeAndUncertaintyEllipsoid
Parameter EllipsoidPointWithAltitudeAndUncertaintyEllipsoid defined in TS 36.355 [54]. The first/leftmost bit of the first octet contains the most significant bit.
ellipsoidPointWithUncertaintyCircle
Parameter Ellipsoid-PointWithUncertaintyCircle defined in TS 36.355 [54]. The first/leftmost bit of the first octet contains the most significant bit.
ellipsoidPointWithUncertaintyEllipse
Parameter EllipsoidPointWithUncertaintyEllipse defined in TS 36.355 [54]. The first/leftmost bit of the first octet contains the most significant bit.
gnss-TOD-msec
Parameter Gnss-TOD-msec defined in TS 36.355 [54]. The first/leftmost bit of the first octet contains the most significant bit.
horizontalVelocity
Parameter HorizontalVelocity defined in TS 36.355 [54]. The first/leftmost bit of the first octet contains the most significant bit.
polygon
Parameter Polygon defined in TS 36.355 [54]. The first/leftmost bit of the first octet contains the most significant bit.
verticalVelocityAndUncertainty
Parameter verticalVelocityAndUncertainty corresponds to horizontalWithVerticalVelocityAndUncertainty defined in TS 36.355 [54]. The first/leftmost bit of the first octet contains the most significant bit.
verticalVelocity
Parameter verticalVelocity corresponds to horizontalWithVerticalVelocity defined in TS 36.355 [54]. The first/leftmost bit of the first octet contains the most significant bit.

Next Quotation

AbsoluteTimeInfo

60

The IE AbsoluteTimeInfo indicates an absolute time in a format YY-MM-DD HH:MM:SS and using BCD encoding. The first/leftmost bit of the bit string contains the most 65 significant bit of the most significant digit of the year and so on.

---

AbsoluteTimeInfo information element

---

AbsoluteTimeInfo-r10 ::=　　　BIT STRING (SIZE (48))

---

Next Quotation
FlightPathInfoReportConfig
　　The IE FlightPathInfoReportConfig specifies flight path information report configuration.

---

FlightPathInfoReportConfig information element

---

```
FlightPathInfoReportConfig-r15 ::= SEQUENCE {
    maxWayPointNumber-r15        INTEGER (1..maxWayPoint-r15),
    includeTimeStamp-r15         ENUMERATED {true}       OPTIONAL
}
```

---

FlightPathInfoReportConfig field descriptions

--- maxWayPointNumber
Indicates the maximum number of way points UE can include in the flight path information report if this information is available at the UE.
includeTimeStamp
Indicates whether time stamp of each way point can be reported in the flight path information report if time stamp information is available at the UE.

---

Figure 6:
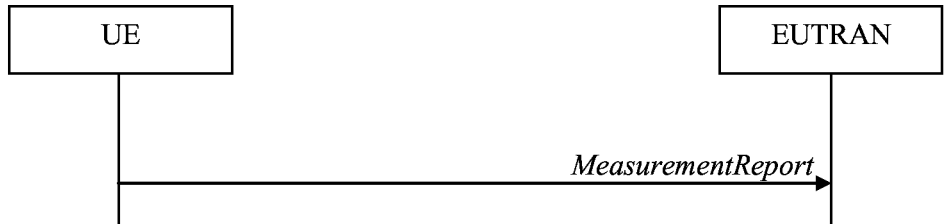
FIG. 6 is a reproduction of FIG. 5.5.5.1-1: Measurement reporting, from 3GPP TS 36.331 V17.2.0, "E-UTRA, RRC protocol specification".

Quotation End
　　The height based report in LTE is specified in TS 38.331 ([3] 3GPP TS 36.331 V17.2.0, "E-UTRA, RRC protocol specification") as below:
Quotation Start [3]
5.5.5 Measurement Reporting
5.5.5.1 General
　　FIG. 6 is a reproduction of FIG. 5.5.5.1-1: Measurement reporting, from 3GPP TS 36.331 V17.2.0, "E-UTRA, RRC protocol specification".
　　The purpose of this procedure is to transfer measurement results from the UE to E-UTRAN. The UE shall initiate this procedure only after successful security activation.

For the measId for which the measurement reporting procedure was triggered, the UE shall set the measResults within the MeasurementReport message as follows:

1> if the triggerType is set to event; and if eventId is set to eventH1 or eventH2:

2> set the heightUE to include the altitude of the UE;

Next Quotation

MeasResults

The IE MeasResults covers measured results for intra-frequency, inter-frequency and inter-RAT mobility and for idle/inactive measurements.

---

MeasResults information element

---

```
MeasResults ::=                  SEQUENCE {
    measId                           MeasId,
    measResultPCell                  SEQUENCE {
        rsrpResult                       RSRP-Range,
        rsrqResult                       RSRQ-Range
    },
    measResultNeighCells             CHOICE {
        measResultListEUTRA              MeasResultListEUTRA,
        measResultListUTRA               MeasResultListUTRA,
        measResultListGERAN              MeasResultListGERAN,
        measResultsCDMA2000              MeasResultsCDMA2000,
        ...,
        measResultNeighCellListNR-r15        MeasResultCellListNR-r15
    }                                                        OPTIONAL,
    [...]
        heightUE-r15                     INTEGER (–400..8880)       OPTIONAL
    [...]
}
[...]
```

---

MeasResults field descriptions heightUE
Indicates height of the UE in meters relative to the sea level. Value 0 corresponds to sea level (i.e., negative value indicates depth of the UE below sea level). Value −400 corresponds to −400 m, value −399 corresponds to −399 m and so on.
measId
Identifies the measurement identity for which the reporting is being performed. If the measId-v1250 is included, the measId (i.e. without a suffix) is ignored by eNB.
measResultListEUTRA
List of measured results for the maximum number of reported best cells for an E-UTRA measurement identity. For UE supporting CE Mode B, when CE mode B is not restricted by upper layers, measResult-v1360 is reported if the measured RSRP is less than −140 dBm.
measResultPCell
Measured result of the PCell. For BL UEs or UEs in CE, when operating in CE Mode B, measResultPCell-v1360 is reported if the measured RSRP is less than −140 dBm. [...]
rsrpResult
Measured RSRP result of an E-UTRA cell.
The rsrpResult is only reported if configured by the eNB.
rsrqResult
Measured RSRQ result of an E-UTRA cell.
The rsrqResult is only reported if configured by the eNB.
If the measurement is performed in RRC_CONNECTED and measurements based on RSS is enabled in the cell in measRSS-DedicatedConfig-r16, E-UTRAN ignores rsrqResult.

Next Quotation
ReportConfigEUTRA
    The E-UTRA reporting events concerning Aerial UE height are labelled HN with N equal to 1 and 2.
        Event H1: Aerial UE height becomes higher than absolute threshold;
        Event H2: Aerial UE height becomes lower than absolute threshold.

ReportConfigEUTRA information element

| ReportConfigEUTRA ::= | SEQUENCE { |
| triggerType | |
| event | CHOICE { |
| eventId | SEQUENCE { |
| [...] | CHOICE { |
| eventH1-r15 | SEQUENCE { |
| h1-ThresholdOffset-r15 | INTEGER (0..300), |

-continued

ReportConfigEUTRA information element

| h1-Hysteresis-r15 | INTEGER (1..16) |
| }, | |
| eventH2-r15 | SEQUENCE { |
| h2-ThresholdOffset-r15 | INTEGER (0..300), |
| h2-Hysteresis-r15 | INTEGER (1..16) |
| } | |
| }, | |
| hysteresis | Hysteresis, |
| timeToTrigger | TimeToTrigger |
| }, | |
| [...] | |
| }, | |
| [...] | |
| } | |
| [...] | |

ReportConfigEUTRA field descriptions eventId
Choice of E-UTRA event triggered reporting criteria. EUTRAN may set this field to eventC1 or eventC2 only if measDS-Config is configured in the associated measObject with one or more CSI-RS resources. The eventC1 and eventC2 are not applicable for the eventId if RS-SINR is configured as triggerQuantity or reportQuantity.
h1-Hysteresis, h2-Hysteresis
This parameter is used within the entry and leave condition of an event triggered reporting condition for event H1 and event H2. The actual value is field value. If this field is configured UE shall ignore parameter hysteresis.
h1-ThresholdOffset, h2-ThresholdOffset
An offset value to heightThreshRef to obtain the threshold to be used in EUTRA height report triggering condition for event H1 and event H2. The value for h1-ThresholdOffset and h2-ThresholdOffset is expressed in meters such that granularity is 2 meters. Value 0 corresponds to offset value 0 m, value 1 corresponds to offset value 2 m, value 2 correspond to offset value 4 m, and so on.
timeToTrigger
Time during which specific criteria for the event needs to be met in order to trigger a measurement report, or to execute the conditional reconfiguration evaluation.

Quotation End

In NTN, uncrewed aerial vehicles (UAV) is introduced in release 18. The description of the work item of UAV is specified in [1] RP-213600, "WI on NR Support for UAV" as below:

Quotation Start [1]

3 Justification

In the recent years, the global interest for uncrewed aerial vehicles based services has dramatically increased, including e.g. for multiple drone operation, personal entertainment for flight experience, cargo delivery, etc. As the basis of these applications, the capability for remote control and data transmission are key aspects for enhancements, which are of interest for service providers/operators as well as drone manufacturers.

Consequently, corresponding SI and WI based on LTE were established in previous releases, mainly focusing on aerial vehicles with an altitude up to 300 m. According to the study, the feasibility and required enhancements have been verified for the support aerial vehicles via terrestrial cellular systems, e.g. in terms of UL and DL interference as well as mobility. However, since LTE was designed for terrestrial UEs, without considering aerial UEs at the very beginning, some inherent limitations, e.g. higher latency, reduced MIMO capabilities imply that some requirements for aerial services still cannot be met.

Compared to LTE, NR enables more diversified applications for aerial vehicles, with the lower latency for control and higher data rate for multi-media services.

While the advanced NR features generally improve performance with respect to basic LTE, it is clear that further improvements are needed, due to the fact that the NR system didn't take aerial vehicles into account when it was initially designed. Moreover, the interference issues that may be generated by aerial UEs have to be considered in order not to disrupt the operation of a network designed for terrestrial UEs.

4 Objective 4.1 Objective of SI or Core part WI or Testing part WI

1. Specify the following enhancements on measurement reports [RAN2]:

UE-triggered measurement report based on configured height thresholds

Reporting of height, location and speed in measurement report

Flight path reporting

Measurement reporting based on a configured number of cells (i.e. larger than one) fulfilling the triggering criteria simultaneously Note: Work done in LTE is a starting point for this objective. NR-specific enhancements can be considered, if needed, while overall the LTE and NR solutions should be harmonized as much as possible.

2. Specify the signaling to support subscription-based aerial-UE identification [RAN3/SA2 interaction/RAN2]

Note: Work done in LTE is a starting point for this objective. NR-specific enhancements can be considered, if needed, while overall the LTE and NR solutions should be harmonized as much as possible.

Quotation End

Some agreements for UAV have been made in 3GPP meetings as below:

In RAN2 #119:

1. Use LTE principle as a baseline, introduce similar event H1 (aerial UE height become higher than threshold) and H2 (aerial UE height become lower than threshold). FFS if further NR enhancements are needed. FFS study scaling of RRM parameters (e.g. which parameters and what is the purpose/benefit of the scaling and how). FFS how to limit excessive measurements and measurement reporting. FFS if user consent is needed for location reporting in CONNECTED. FFS study the vertical movement and associated mobility for UAV UEs.

2. Rel-18 NR supports reporting of UAV UE's height, location and velocity. It is for further study what accuracy and reporting mechanisms are required and if further enhancements are needed.

3. As in LTE, flight path plan reporting will be introduced. Location list of waypoints (3D location information) and timestamp is adopted as the basic content of flight path report. FFS if timestamp is mandatory or optional for NR. FFS if further enhancements are needed.

4. Introduce similar functionality to LTE (numberofTriggeringCells). FFS whether numberoftriggerbeams for NR is required or other enhancements. FFS study how to avoid sending the measurement reports mainly due to reportOnLeave.

In RAN2 #119bis:

1. The time information reported as part of flight path plan is optional. UE includes time info, if configured by the network and available at the UE. FFS on flight path details (waypoints and what is time information).

2. Allow the flight path to be updated. FFS on the details.

3. FFS on reporting format and initial flight path reporting (i.e. what information to report and how)—next meeting 4. Continue to study height-depending scaling, triggering and combinations 5. As in LTE, as a baseline, events A3, A4 and A5 can be configured with the configured number of cells (numberofTriggeringCells)

The UE assistance information in NR is specified in TS 38.331 ([4] 3GPP TS 38.331 V17.2.0, "NR, RRC protocol specification") as below:

Quotation Start [4]

5.7.4 UE Assistance Information 5.7.4.1 General

Figure 7:
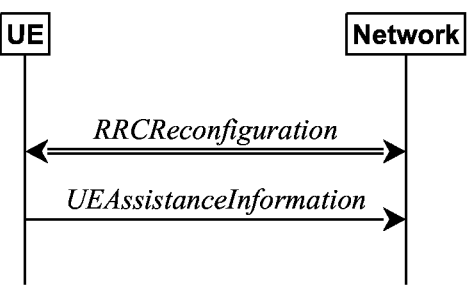
FIG. 7 is a reproduction of FIG. 5.7.4.1-1: UE Assistance Information, from 3GPP TS 38.331 V17.2.0, "NR, RRC protocol specification".

FIG. 7 is a reproduction of FIG. 5.7.4.1-1: UE Assistance Information, from 3GPP TS 38.331 V17.2.0, "NR, RRC protocol specification".

The purpose of this procedure is for the UE to inform the network of:

its delay budget report carrying desired increment/decrement in the connected mode DRX cycle length, or;

its overheating assistance information, or;

its IDC assistance information, or;

its preference on DRX parameters for power saving, or;

its preference on the maximum aggregated bandwidth for power saving, or;

its preference on the maximum number of secondary component carriers for power saving, or;

its preference on the maximum number of MIMO layers for power saving, or;

its preference on the minimum scheduling offset for cross-slot scheduling for power saving, or;

its preference on the RRC state, or;

configured grant assistance information for NR sidelink communication, or;

its preference in being provisioned with reference time information, or;

its preference for FR2 UL gap, or;

its preference to transition out of RRC_CONNECTED state for MUSIM operation, or;

its preference on the MUSIM gaps, or;

its relaxation state for RLM measurements, or;

its relaxation state for BFD measurements, or;

availability of data and/or signalling mapped to radio bearers which are not configured for SDT, or;

its preference for the SCG to be deactivated, or;

indicate that the UE has uplink data to transmit for a DRB for which there is no MCG RLC bearer while the SCG is deactivated, or;

change of its fulfilment status for RRM measurement relaxation criterion, or;

service link (specified in TS 38.300 [2]) propagation delay difference between serving cell and neighbour cell(s).

5.7.4.2 Initiation

A UE capable of providing delay budget report in RRC-_CONNECTED may initiate the procedure in several cases, including upon being configured to provide delay budget report and upon change of delay budget preference.

A UE capable of providing overheating assistance information in RRC_CONNECTED may initiate the procedure if it was configured to do so, upon detecting internal overheating, or upon detecting that it is no longer experiencing an overheating condition.

A UE capable of providing IDC assistance information in RRC_CONNECTED may initiate the procedure if it was configured to do so, upon detecting IDC problem if the UE did not transmit an IDC assistance information since it was configured to provide IDC indications, or upon change of IDC problem information.

A UE capable of providing its preference on DRX parameters of a cell group for power saving in RRC_CONNECTED may initiate the procedure in several cases, if it was configured to do so, including upon having a preference on DRX parameters and upon change of its preference on DRX parameters.

A UE capable of providing its preference on the maximum aggregated bandwidth of a cell group for power saving in RRC_CONNECTED may initiate the procedure in several cases, if it was configured to do so, including upon having a maximum aggregated bandwidth preference and upon change of its maximum aggregated bandwidth preference.

A UE capable of providing its preference on the maximum number of secondary component carriers of a cell group for power saving in RRC_CONNECTED may initiate the procedure in several cases, if it was configured to do so, including upon having a maximum number of secondary component carriers preference and upon change of its maximum number of secondary component carriers preference.

A UE capable of providing its preference on the maximum number of MIMO layers of a cell group for power saving in RRC_CONNECTED may initiate the procedure in several cases, if it was configured to do so, including upon having a maximum number of MIMO layers preference and upon change of its maximum number of MIMO layers preference.

A UE capable of providing its preference on the minimum scheduling offset for cross-slot scheduling of a cell group for power saving in RRC_CONNECTED may initiate the procedure in several cases, if it was configured to do so, including upon having a minimum scheduling offset preference and upon change of its minimum scheduling offset preference.

A UE capable of providing assistance information to transition out of RRC_CONNECTED state may initiate the procedure if it was configured to do so, upon determining that it prefers to transition out of RRC_CONNECTED state, or upon change of its preferred RRC state.

A UE capable of providing configured grant assistance information for NR sidelink communication in RRC_CO-NNECTED may initiate the procedure in several cases, including upon being configured to provide traffic pattern information and upon change of traffic patterns.

A UE capable of providing an indication of its preference in being provisioned with reference time information may initiate the procedure upon being configured to provide this indication, or if it was configured to provide this indication and upon change of its preference.

A UE capable of providing an indication of its preference in FR2 UL gap may initiate the procedure if it was configured to do so, upon detecting the need of FR2 UL gap activation/deactivation.

A UE capable of providing MUSIM assistance information for gap preference may initiate the procedure if it was configured to do so, upon determining it needs the gaps, or upon change of the gap preference information.

A UE capable of providing MUSIM assistance information for leave indication may initiate the procedure if it was configured to do so upon determining that it needs to leave RRC_CONNECTED state.

A UE capable of relaxing its RLM measurements of a cell group in RRC_CONNECTED state shall initiate the procedure for providing an indication of its relaxation state for RLM measurements upon being configured to do so, and upon change of its relaxation state for RLM measurements in RRC_CONNECTED state.

A UE capable of relaxing its BFD measurements in serving cells of a cell group in RRC_CONNECTED shall initiate the procedure for providing an indication of its relaxation state for BFD measurements upon being configured to do so, and upon change of its relaxation state for BFD measurements in RRC_CONNECTED state.

A UE capable of SDT initiates this procedure when data and/or signalling mapped to radio bearers that are not configured for SDT becomes available during SDT (i.e. while SDT procedure is ongoing).

A UE capable of providing its preference for SCG deactivation may initiate the procedure if it was configured to do so, upon determining that it prefers or does no more prefer the SCG to be deactivated.

A UE that has uplink data to transmit for a DRB for which there is no MCG RLC bearer while the SCG is deactivated shall initiate the procedure.

A UE capable of providing an indication of fulfilment of the RRM measurement relaxation criterion in connected mode may initiate the procedure if it was configured to do so, upon change of its fulfilment status for RRM measurement relaxation criterion for connected mode.

A UE capable of providing service link propagation delay difference between serving cell and neighbour cell(s) shall initiate the procedure upon being configured to do so, and upon determining that service link propagation delay difference between serving cell and a neighbour cell has changed more than threshPropDelayDif compared with the last reported value.

Next Quotation

UEAssistanceInformation

The UEAssistanceInformation message is used for the indication of UE assistance information to the network.

Signalling radio bearer: SRB1, SRB3

RLC-SAP: AM

Logical channel: DCCH

Direction: UE to Network

Next Quotation
UEInformationResponse
    The UEInformationResponse message is used by the UE
to transfer information requested by the network.
    Signalling radio bearer: SRB1 or SRB2 (when logged
        measurement information is included)
    RLC-SAP: AM
    Logical channel: DCCH
    Direction: UE to network

---

UEInformationResponse message

```
UEInformationResponse-r16 ::=        SEQUENCE {
    rrc-TransactionIdentifier                RRC-TransactionIdentifier,
    criticalExtensions                       CHOICE {
        ueInformationResponse-r16                UEInformationResponse-r16-IEs,
        criticalExtensionsFuture                 SEQUENCE { }
    }
}
UEInformationResponse-r16-IEs ::=    SEQUENCE {
    measResultIdleEUTRA-r16                  MeasResultIdleEUTRA-r16          OPTIONAL,
    measResultIdleNR-r16                     MeasResultIdleNR-r16            OPTIONAL,
    logMeasReport-r16                        LogMeasReport-r16              OPTIONAL,
    connEstFailReport-r16                    ConnEstFailReport-r16          OPTIONAL,
    ra-ReportList-r16                        RA-ReportList-r16              OPTIONAL,
    rlf-Report-r16                           RLF-Report-r16                OPTIONAL,
    mobilityHistoryReport-r16                MobilityHistoryReport-r16      OPTIONAL,
    lateNonCriticalExtension                 OCTET STRING                  OPTIONAL,
    nonCriticalExtension                     UEInformationResponse-v1700-IEs  OPTIONAL
}
UEInformationResponse-v1700-IEs ::=  SEQUENCE {
    successHO-Report-r17                     SuccessHO-Report-r17           OPTIONAL,
    connEstFailReportList-r17                ConnEstFailReportList-r17      OPTIONAL,
    coarseLocationInfo-r17                   OCTET STRING                  OPTIONAL,
    nonCriticalExtension                     SEQUENCE { }                  OPTIONAL
}
[...]
```

---

UEInformationResponse-IEs field descriptions coarseLocationInfo
Parameter type Ellipsoid-Point defined in TS 37.355 [49]. The first/leftmost bit of the first octet contains the most
significant bit. The least significant bits of degreesLatitude and degreesLongitude are set to 0 to meet the accuracy
requirement corresponds to a granularity of approximately 2 km.
It is up to UE implementation how many LSBs are set to 0 to meet the accuracy requirement.
connEstFailReport
This field is used to provide connection establishment failure or connection resume failure information.
logMeasReport
This field is used to provide the measurement results stored by the UE associated to logged MDT.
rlf-Report
This field is used to indicate the RLF report related contents.
successHO-Report
This field is used to provide the successful handover report if triggered based on the successful handover configura-
tion.

---

LogMeasReport field descriptions absoluteTimeStamp
Indicates the absolute time when the logged measurement configuration logging is provided, as indicated by NR within
absoluteTimeInfo.
relativeTimeStamp
Indicates the time of logging measurement results, measured relative to the absoluteTimeStamp. Value in seconds.

---

Quotation End
    Some configurations for measurement report and location
report in NR are specified in TS 38.331 ([4] 3GPP TS 38.331
V17.2.0, "NR, RRC protocol specification") as below:
Quotation Start [4]

CommonLocationInfo
    The IE CommonLocationInfo is used to transfer detailed
location information available at the UE to correlate mea-
surements and UE position information.

---

CommonLocationInfo information element

---

```
CommonLocationInfo-r16 ::= SEQUENCE {
    gnss-TOD-msec-r16          OCTET STRING      OPTIONAL,
    locationTimestamp-r16      OCTET STRING      OPTIONAL,
    locationCoordinate-r16     OCTET STRING      OPTIONAL,
    locationError-r16          OCTET STRING      OPTIONAL,
    locationSource-r16         OCTET STRING      OPTIONAL,
    velocityEstimate-r16       OCTET STRING      OPTIONAL
}
```

---

---

CommonLocationInfo field descriptions

--- gnss-TOD-msec
Parameter type gnss-TOD-msec defined in TS 37.355 [49]. The first/leftmost bit of the first octet contains the most significant bit.
locationTimeStamp
Parameter type DisplacementTimeStamp defined in TS 37.355 [49]. The first/leftmost bit of the first octet contains the most significant bit.
locationCoordinate
Parameter type LocationCoordinates defined in TS 37.355 [49]. The first/leftmost bit of the first octet contains the most significant bit.
locationError
Parameter LocationError defined in TS 37.355 [49]. The first/leftmost bit of the first octet contains the most significant bit.
locationSource
Parameter LocationSource defined in TS 37.355 [49]. The first/leftmost bit of the first octet contains the most significant bit.
velocityEstimate
Parameter type Velocity defined in TS 37.355 [49]. The first/leftmost bit of the first octet contains the most significant bit.

---

Next Quotation
LocationInfo
    The IE LocationInfo is used to transfer available detailed location information, Bluetooth, WLAN and sensor available measurement results at the UE.

---

LocationInfo information element

---

```
LocationInfo-r16 ::=      SEQUENCE {
    commonLocationInfo-r16     CommonLocationInfo-r16        OPTIONAL,
    bt-LocationInfo-r16        LogMeasResultListBT-r16       OPTIONAL,
    wlan-LocationInfo-r16      LogMeasResultListWLAN-r16     OPTIONAL,
    sensor-LocationInfo-r16    Sensor-LocationInfo-r16       OPTIONAL,
    ...
}
```

---

Next Quotation

---

MeasResults information element

---

```
MeasResults ::=                SEQUENCE {
    measId                         MeasId,
    measResultServingMOList        MeasResultServMOList,
    measResultNeighCells           CHOICE {
        measResultListNR               MeasResultListNR,
        [...]
    }
}
OPTIONAL,
    [...]
    locationInfo-r16               LocationInfo-r16
OPTIONAL,
    [...]
```

---

-continued

---

MeasResults information element

---

```
    coarseLocationInfo-r17              OCTET STRING
OPTIONAL
}
[...]
```

---

---

MeasResultNR field descriptions

--- locationInfo
Positioning related information and measurements.

---

---

MeasResults field descriptions

--- coarseLocationInfo
This field indicates the coarse location information reported by the UE. This field is coded as the Ellipsoid-Point defined in -continued

| MeasResults field descriptions |
| --- |
| TS 37.355 [49]. The first/leftmost bit of the first octet contains the most significant bit. The least significant bits of degreesLatitude and degreesLongitude are set to 0 to meet the accuracy requirement corresponds to a granularity of approximately 2 km.<br>It is up to UE implementation how many LSBs are set to 0 to meet the accuracy requirement<br>measId<br>Identifies the measurement identity for which the reporting is being performed.<br>measResultListNR<br>List of measured results for the maximum number of reported best cells for an NR measurement identity. |

Next Quotation

ReportConfigNR

The IE ReportConfigNR specifies criteria for triggering of an NR measurement reporting event or of a CHO, CPA or CPC event or of an L2 U2N relay measurement reporting event. For events labelled AN with N equal to 1, 2 and so on, measurement reporting events and CHO, CPA or CPC events are based on cell measurement results, which can either be derived based on SS/PBCH block or CSI-RS.

Event A1: Serving becomes better than absolute threshold;

Event A2: Serving becomes worse than absolute threshold;

Event A3: Neighbour becomes amount of offset better than PCell/PSCell;

Event A4: Neighbour becomes better than absolute threshold;

Event A5: PCell/PSCell becomes worse than absolute threshold) AND Neighbour/SCell becomes better than another absolute threshold2;

Event A6: Neighbour becomes amount of offset better than SCell;

Event D1: Distance between UE and a reference location referenceLocation1 becomes larger than configured threshold distanceThreshFromReference1 and distance between UE and a reference location referenceLocation2 becomes shorter than configured threshold distanceThreshFromReference2;

CondEvent A3: Conditional reconfiguration candidate becomes amount of offset better than PCell/PSCell;

CondEvent A4: Conditional reconfiguration candidate becomes better than absolute threshold;

CondEvent A5: PCell/PSCell becomes worse than absolute threshold) AND Conditional reconfiguration candidate becomes better than another absolute threshold2;

CondEvent D1: Distance between UE and a reference location referenceLocation1 becomes larger than configured threshold distanceThreshFromReference1 and distance between UE and a reference location referenceLocation2 of conditional reconfiguration candidate becomes shorter than configured threshold distanceThreshFromReference2;

CondEvent T1: Time measured at UE becomes more than configured threshold t1–Threshold but is less than t1–Threshold+duration;

[ . . . ]

| ReportConfigNR information element | |
| --- | --- |
| ReportConfigNR ::= | SEQUENCE { |
|   reportType | CHOICE { |
|     periodical | PeriodicalReportConfig, |
|     eventTriggered | EventTriggerConfig, |
|     [...] | |
|   } | |
| } | |
| [...] | |
| CondTriggerConfig-r16 ::= | SEQUENCE { |
|   condEventId | CHOICE { |
|     condEventA3 | SEQUENCE { |
|       a3-Offset | MeasTriggerQuantityOffset, |
|       hysteresis | Hysteresis, |
|       timeToTrigger | TimeToTrigger |
|     }, | |
|     condEventA5 | SEQUENCE { |
|       a5-Threshold1 | MeasTriggerQuantity, |
|       a5-Threshold2 | MeasTriggerQuantity, |
|       hysteresis | Hysteresis, |
|       timeToTrigger | TimeToTrigger |
|     }, | |
|     ..., | |
|     condEventA4-r17 | SEQUENCE { |
|       a4-Threshold-r17 | MeasTriggerQuantity, |
|       hysteresis-r17 | Hysteresis, |
|       timeToTrigger-r17 | TimeToTrigger |
|     }, | |
|     condEventD1-r17 | SEQUENCE { |
|       distanceThreshFromReference1-r17 | INTEGER(0.. 65525), |
|       distanceThreshFromReference2-r17 | INTEGER(0.. 65525), |
|       referenceLocation1-r17 | ReferenceLocation-r17, |
|       referenceLocation2-r17 | ReferenceLocation-r17, |
|       hysteresisLocation-r17 | HysteresisLocation-r17, |
|       timeToTrigger-r17 | TimeToTrigger |
|     }, | |

-continued

```
                              ReportConfigNR  information element
        condEventT1-r17                  SEQUENCE {
            t1-Threshold-r17                 INTEGER (0..549755813887),
            duration-r17                     INTEGER (1..6000)
        }
    },
    rsType-r16                       NR-RS-Type,
    ...
}
EventTriggerConfig::=                         SEQUENCE {
    eventId                                       CHOICE {
        eventA1                                       SEQUENCE {
            a1-Threshold                                  MeasTriggerQuantity,
            reportOnLeave                                 BOOLEAN,
            hysteresis                                    Hysteresis,
            timeToTrigger                                 TimeToTrigger
        },
        eventA2                                       SEQUENCE {
            a2-Threshold                                  MeasTriggerQuantity,
            reportOnLeave                                 BOOLEAN,
            hysteresis                                    Hysteresis,
            timeToTrigger                                 TimeToTrigger
        },
        eventA3                                       SEQUENCE {
            a3-Offset                                     MeasTriggerQuantityOffset,
            reportOnLeave                                 BOOLEAN,
            hysteresis                                    Hysteresis,
            timeToTrigger                                 TimeToTrigger,
            useAllowedCellList                            BOOLEAN
        },
        eventA4                                       SEQUENCE {
            a4-Threshold                                  MeasTriggerQuantity,
            reportOnLeave                                 BOOLEAN,
            hysteresis                                    Hysteresis,
            timeToTrigger                                 TimeToTrigger,
            useAllowedCellList                            BOOLEAN
        },
        eventA5                                       SEQUENCE {
            a5-Threshold1                                 MeasTriggerQuantity,
            a5-Threshold2                                 MeasTriggerQuantity,
            reportOnLeave                                 BOOLEAN,
            hysteresis                                    Hysteresis,
            timeToTrigger                                 TimeToTrigger,
            useAllowedCellList                            BOOLEAN
        },
        eventA6                                       SEQUENCE {
            a6-Offset                                     MeasTriggerQuantityOffset,
            reportOnLeave                                 BOOLEAN,
            hysteresis                                    Hysteresis,
            timeToTrigger                                 TimeToTrigger,
            useAllowedCellList                            BOOLEAN
        },
        ...,
        eventX1-r17                                   SEQUENCE {
            x1-Threshold1-Relay-r17                       SL-MeasTriggerQuantity-r16,
            x1-Threshold2-r17                             MeasTriggerQuantity,
            reportOnLeave-r17                             BOOLEAN,
            hysteresis-r17                                Hysteresis,
            timeToTrigger-r17                             TimeToTrigger,
            useAllowedCellList-r17                        BOOLEAN
        },
        eventX2-r17                                   SEQUENCE {
            x2-Threshold-Relay-r17                        SL-MeasTriggerQuantity-r16,
            reportOnLeave-r17                             BOOLEAN,
            hysteresis-r17                                Hysteresis,
            timeToTrigger-r17                             TimeToTrigger
        },
        eventD1-r17                                   SEQUENCE {
            distanceThreshFromReference1-r17              INTEGER(1.. 65525),
            distanceThreshFromReference2-r17              INTEGER(1.. 65525),
            referenceLocation1-r17                        ReferenceLocation-r17,
            referenceLocation2-r17                        ReferenceLocation-r17,
            reportOnLeave-r17                             BOOLEAN,
            hysteresisLocation-r17                        HysteresisLocation-r17,
            timeToTrigger-r17                             TimeToTrigger
        }
    },
    rsType                            NR-RS-Type,
```

-continued

| ReportConfigNR information element | |
| --- | --- |
| report Interval | Report Interval, |
| [...] | |
| coarseLocationRequest-r17 | ENUMERATED {true} |
| OPTIONAL,   -- Need R | |
| [...] | |
| } | |
| [...] | |

| CondTriggerConfig field descriptions |
| --- |
| condEventId |
| Choice of NR conditional reconfiguration event triggered criteria. |
| distanceThreshFromReference1, distanceThreshFromReference2 |
| Distance from a reference location configured with referenceLocation1 or referenceLocation2. Each step represents 50 m. |
| duration |
| This field is used for defining the leaving condition T1-2 for conditional HO event condEventT1. Each step represents 100 ms. |
| referenceLocation1, referenceLocation2 |
| Reference locations used for condEventD1. The referenceLocation1 is associated to serving cell and referenceLocation2 is associated to candidate target cell. |
| t1-Threshold |
| The field counts the number of UTC seconds in 10 ms units since 00:00:00 on Gregorian calendar date 1 Jan., 1900 (midnight between Sunday, Dec. 31, 1899 and Monday, Jan. 1, 1900). |
| timeToTrigger |
| Time during which specific criteria for the event needs to be met in order to execute the conditional reconfiguration evaluation. |

| EventTriggerConfig field descriptions |
| --- |
| aN-ThresholdM |
| Threshold value associated to the selected trigger quantity (e.g. RSRP, RSRQ, SINR) per RS Type (e.g. SS/PBCH block, CSI-RS) to be used in NR measurement report triggering condition for event number aN. If multiple thresholds are defined for event number aN, the thresholds are differentiated by M. The network configures aN-Threshold1 only for events A1, A2, A4, A5 and a5-Threshold2 only for event A5. In the same eventA5, the network configures the same quantity for the MeasTriggerQuantity of the a5-Threshold1 and for the MeasTriggerQuantity of the a5-Threshold2. |
| coarseLocationRequest |
| This field is used to request UE to report coarse location information. |
| distanceThreshFromReference1, distanceThreshFromReference2 |
| Threshold value associated to the distance from a reference location configured with referenceLocation1 or referenceLocation2. Each step represents 50 m. |
| eventId |
| Choice of NR event triggered reporting criteria. |
| maxReportCells |
| Max number of non-serving cells to include in the measurement report. |
| referenceLocation1, referenceLocation2 |
| Reference locations used for eventD1. The referenceLocation1 is associated to serving cell and referenceLocation2 is associated to neighbour cell. |
| reportOnLeave |
| Indicates whether or not the UE shall initiate the measurement reporting procedure when the leaving condition is met for a cell in cellsTriggeredList, as specified in 5.5.4.1. |
| Indicates whether or not the UE shall initiate the measurement reporting procedure when the leaving condition is met if configured in eventD1, as specified in 5.5.4.1. |
| timeToTrigger |
| Time during which specific criteria for the event needs to be met in order to trigger a measurement report. |

In addition, the configuration of satellite information is specified in TS 38.331 ([4] 3GPP TS 38.331 V17.2.0, "NR, RRC protocol specification") as below:

Quotation Start [4]

SIB19

SIB19 contains satellite assistance information for NTN access.

| SIB19 information element |
| --- |

```
SIB19-r17 ::= SEQUENCE {
    ntn-Config-r17                      NTN-Config-r17
OPTIONAL,       -- Need R
    t-Service-r17                       INTEGER (0..549755813887)
OPTIONAL,       -- Need R
    referenceLocation-r17               ReferenceLocation-r17
OPTIONAL,       -- Need R
    distanceThresh-r17                  INTEGER(0..65525)
OPTIONAL,       -- Need R
    ntn-NeighCellConfigList-r17         NTN-NeighCellConfigList-r17
OPTIONAL,       -- Need R
    lateNonCriticalExtension            OCTET STRING
OPTIONAL,
    ...,                                NTN-NeighCellConfigList-r17              OPTIONAL
    ntn-NeighCellConfigListExt-v1720
-- Need R
}
NTN-NeighCellConfigList-r17 ::=   SEQUENCE (SIZE(1..maxCellNTN-r17)) OF NTN-NeighCellConfig-
r17
NTN-NeighCellConfig-r17 ::=     SEQUENCE {
    ntn-Config-r17                      NTN-Config-r17
OPTIONAL,       -- Need R
    carrierFreq-r17                     ARFCN-ValueNR
OPTIONAL,       -- Need R
    physCellId-r17                      PhysCellId                               OPTIONAL
-- Need R
}
```

| SIB19 field descriptions |
| --- | distanceThresh
Distance from the serving cell reference location and is used in location-based measurement initiation in RRC_IDLE and
RRC_INACTIVE, as defined in TS 38.304 [20]. Each step represents 50 m.
ntn-Config
Provides parameters needed for the UE to access NR via NTN access such as Ephemeris data, common TA
parameters, k_offset, validity duration for UL sync information and epoch.
ntn-NeighCellConfigList, ntn-NeighCellConfigListExt
Provides a list of NTN neighbour cells including their ntn-Config, carrier frequency and PhysCellId. This set includes all
elements of ntn-NeighCellConfigList and all elements of ntn-NeighCellConfigListExt. If ntn-Config is absent for an entry in
ntn-NeighCellConfigListExt, the ntn-Config provided in the entry at the same position in ntn-NeighCellConfigList applies.
referenceLocation
Reference location of the serving cell provided via NTN quasi-Earth fixed system and is used in location-based
measurement initiation in RRC_IDLE and RRC_INACTIVE, as defined in TS 38.304 [20].
t-Service
Indicates the time information on when a cell provided via NTN quasi-Earth fixed system is going to stop serving the area
it is currently covering. The field indicates a time in multiples of 10 ms after 00:00:00 on Gregorian calendar date 1
Jan., 1900 (midnight between Sunday, Dec. 31, 1899 and Monday, Jan. 1, 1900). The exact stop time is
between the time indicated by the value of this field minus 1 and the time indicated by the value of this field.

Next Quotation
    The IE NTN-Config provides parameters needed for the
UE to access NR via NTN access.

| NTN-Config information element |
| --- |

```
NTN-Config-r17 ::=              SEQUENCE {
    epochTime-r17                       EpochTime-r17
OPTIONAL,   -- Need R
    ntn-UlSyncValidityDuration-r17      ENUMERATED{ s5, s10, s15, s20, s25, s30, s35,
                                            s40, s45, s50, s55, s60, s120, s180, s240, s900}
OPTIONAL,   -- Cond SIB19
    cellSpecificKoffset-r17             INTEGER(1..1023)
OPTIONAL,   -- Need R
    kmac-r17                            INTEGER(1..512)
OPTIONAL,   -- Need R
    ta-Info-r17                         TA-Info-r17
OPTIONAL,   -- Need R
    ntn-PolarizationDL-r17              ENUMERATED {rhcp,lhcp,linear}
OPTIONAL,   -- Need R
    ntn-PolarizationUL-r17              ENUMERATED {rhcp,lhcp,linear}
```

-continued

---

NTN-Config information element

```
OPTIONAL,   -- Need R
  ephemerisInfo-r17              EphemerisInfo-r17
OPTIONAL,   -- Need R
  ta-Report-r17                  ENUMERATED {enabled}
OPTIONAL,   -- Need R
  ...
}
EpochTime-r17 ::=                SEQUENCE {
  sfn-r17                          INTEGER(0..1023),
  subFrameNR-r17                   INTEGER(0..9)
}
TA-Info-r17 ::=                  SEQUENCE {
  ta-Common-r17                    INTEGER(0..66485757),
  ta-CommonDrift-r17               INTEGER(-257303..257303)
OPTIONAL,   -- Need R
  ta-CommonDriftVariant-r17        INTEGER(0..28949)
OPTIONAL   -- Need R
}
```

---

NTN-Config field descriptions

EphemerisInfo
This field provides satellite ephemeris either in format of position and velocity state vector or in format of orbital parameters. This field is excluded when determining changes in system information, i.e. changes to ephemerisInfo should neither result in system information change notifications nor in a modification of valueTag in SIB1.
epochTime
Indicate the epoch time for the NTN assistance information. When explicitly provided through SIB, or through dedicated signaling, EpochTime is the starting time of a DL sub-frame, indicated by a SFN and a sub-frame number signaled together with the assistance information. The reference point for epoch time of the serving satellite ephemeris and Common TA parameters is the uplink time synchronization reference point. If this field is absent, the epoch time is the end of SI window where this SIB19 is scheduled. This field is mandatory present when provided in dedicated configuration. If this field is absent in ntn-Config provided via NTN-NeighCellConfig the UE uses epoch time from the serving satellite ephemeris, otherwise the field is based on the timing of the serving cell, i.e. the SFN and sub-frame number indicated in this field refers to the SFN and sub-frame of the serving cell. In case of handover, this field is based on the timing of the target cell, i.e. the SFN and sub-frame number indicated in this field refers to the SFN and sub-frame of the target cell. This field is excluded when determining changes in system information, i.e. changes to epochTime should neither result in system information change notifications nor in a modification of valueTag in SIB1.
cellSpecificKoffset
Scheduling offset used for the timing relationships that are modified for NTN [see TS 38.211]. The unit of the field K_offset is number of slots for a given subcarrier spacing of 15 kHz. If the field is absent UE assumes value 0.
kmac
Scheduling offset provided by network if downlink and uplink frame timing are not aligned at gNB. It is needed for UE action and assumption on downlink configuration indicated by a MAC CE command in PDSCH [see TS 38.2xy]. If the field is absent UE assumes value 0.
For the reference subcarrier spacing value for the unit of K_mac in FR1, a value of 15 kHz is used. The unit of K_mac is number of slots for a given subcarrier spacing.
ntn-PolarizationDL
If present, this parameter indicates polarization information for downlink transmission on service link: including Right hand, Left hand circular polarizations (RHCP, LHCP) and Linear polarization.
ntn-PolarizationUL
If present, this parameter indicates Polarization information for Uplink service link.
If not present and ntn-PolarizationDL is present, UE assumes the same polarization for UL and DL.
ntn-UlSyncValidityDuration
A validity duration configured by the network for assistance information (i.e. Serving and/or neighbour satellite ephemeris and Common TA parameters) which indicates the maximum time during which the UE can apply assistance information without having acquired new assistance information.
The unit of ntn-UlSyncValidityDuration is second. Value s5 corresponds to 5 s, value s10 indicate 10 s and so on. This parameter applies to both connected and idle mode UEs. If this field is absent in ntn-Config provided via NTN-NeighCellConfig, the UE uses validity duration from the serving cell assistance information. This field is excluded when determining changes in system information, i.e. changes of ntn-UlSyncValidityDuration should neither result in system information change notifications nor in a modification of valueTag in SIB1. ntn-UlSyncValidityDuration is only updated when at least one of epochTime, ta-Info, ephemerisInfo is updated.
ta-Common
Network-controlled common timing advanced value and it may include any timing offset considered necessary by the network. ta-Common with value of 0 is supported. The granularity of ta-Common is $4.072 \times 10^{-3}$ µs. Values are given in unit of corresponding granularity. This field is excluded when determining changes in system information, i.e. changes of ta-Common should neither result in system information change notifications nor in a modification of valueTag in SIB1.
ta-CommonDrift
Indicate drift rate of the common TA. The granularity of ta-CommonDrift is $0.2 \times 10^{-3}$ µs/s Values are given in unit of corresponding granularity. This field is excluded when determining changes in system information, i.e. changes of ta-CommonDrift should neither result in system information change notifications nor in a modification of valueTag in SIB1.
ta-CommonDriftVariant
Indicate drift rate variation of the common TA. The granularity of ta-CommonDriftVariation is $0.2 \times 10^{-4}$ µs/s^2. Values are given in unit of corresponding granularity. This field is excluded when determining changes in system information, i.e.

-continued

| NTN-Config field descriptions |
| --- |
| changes of ta-CommonDriftVariant should neither result in system information change notifications nor in a modification of value Tag in SIB1. |
| ta-Report |
| When this field is included in SIB19, it indicates reporting of timing advanced is enabled during Random Access due to RRC connection establishment or RRC connection resume, and during RRC connection reestablishment.. When this field is included in ServingCellConfigCommon within dedicated signalling, it indicates TA reporting is enabled during Random Access due to reconfiguration with sync (see TS 38.321 [3], clause 5.4.8). |

Quotation End

Figure 8:
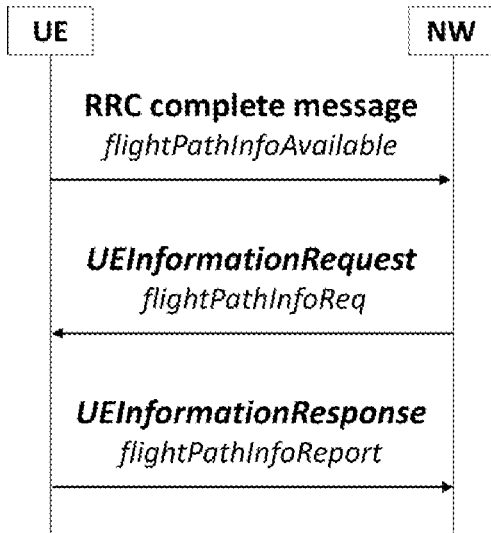
FIG. 8 is an example diagram showing flight path reporting in LTE, in accordance with embodiments of the present invention.

In Long Term Evolution (LTE), the User Equipment (UE) capable of aerial communication (e.g., Unmanned Aerial Vehicle (UAV)) could report flight path information to the Network (NW). The UAV is an aircraft without a human pilot. An aerial UE could move fast leaving the coverage area of serving cell, which may result in handover failure. To improve the mobility performance, flight path reporting was introduced in LTE. The UE could indicate its planned path information is available to the network. The network could request the UE to report the flight path, which would be taken into account to select suitable target cell(s) for the UE to be handed over to. The NW could request the UE to report a flight path for mobility, e.g., handover. An example for flight path reporting in LTE is shown in FIG. 8. During a Radio Resource Control (RRC) connection procedure (e.g., RRC connection establishment, RRC connection resume, RRC connection re-establishment, RRC connection reconfiguration), the UE indicates to the NW that flight path information is available. The UE could transmit an indication (e.g., flightPathInfoAvailable) in an RRC message (e.g., RRCConnectionSetupComplete, RRCConnectionResumeComplete, RRCConnectionReconfigurtionComplete, RRCConnectionReestablishmentComplete) to indicate that flight path information is available. The RRC message is used to complete the RRC connection procedure. After the NW receives the indication (e.g., flightPathInfoAvailable), the NW could request the UE to report flight path information via a request message (e.g., UEInformationRequest). Upon receiving the request message (e.g., UEInformationRequest) comprising indication of flight path information request (e.g., flightPathInfoReq) and/or a configuration of flight path report (e.g., FlightPathInfoReportConfig), the UE transmits a response message (e.g., UEInformationResponse) comprising flight path report (e.g., flightPathInfoReport). The configuration of the flight path report (e.g., FlightPathInfoReportConfig) comprises a configured number of waypoints (e.g., maxWayPointNumber) and an indication of including time stamp (e.g., includeTimeStamp). The flight path report comprises up to the configured number of waypoints (e.g., maxWayPointNumber) represented by 3D locations (e.g., LocationInfo). The flight path report comprises time stamps (e.g., AbsoluteTimeInfo) per waypoint if indicated in the request message (e.g., includeTimeStamp set as true) and if available at the UE. More detail related to the flight path report in LTE could be found in TS 36.331 ([3] 3GPP TS 36.331 V17.2.0, "E-UTRA, RRC protocol specification").

In New Radio (NR), the work item of UAVs is introduced as described in [1] RP-213600, "WI on NR Support for UAV". The aerial communication and/or the flight path report (e.g., based on NW request) in LTE may be applied and/or reused (e.g., as a baseline) in NR. The flight path report could be reported in a Terrestrial Network (TN) and/or a Non-Terrestrial Network (NTN). However, an aerial UE with high-speed mobility can rapidly change a location and the flight plan would be updated. Based on flight reporting in LTE, after the UE connects to a serving cell, the UE cannot report its flight path information when the flight path is changed. With the current mechanism, the UE could only report flight path information when receiving NW request. The NW could not know whether the flight path of a UE has been changed and when to request the UE to update flight path report. And if the NW does not acquire the latest flight path of UEs, for example, the NW would not be able to make appropriate handover decisions. If the update of a flight path report is piggybacked to a measurement report, the flight path update can be reported when a measurement report is triggered. However, the change of a flight path report may not be dependent on the triggering for the measurement report (e.g., change of radio condition). Therefore, a specific trigger for flight path update is needed.

Throughout the disclosure herein, the "flight path report" may be, be referred to, be replaced by, and/or supplemented with "flight path information" or "flight path information report".

Throughout the disclosure herein, the "flight path" may be, be referred to, be replaced by, and/or supplemented with "flight path information".

To enhance the UAV operation in NR, it could allow the flight path information to be updated by the UE. For example, after (or when/in response to) the flight path information (or flight path report) has been updated (e.g., compared to the flight path information previous reported by the UE), the UE may provide an updated flight path information (or flight path report) to the NW. Alternatively or additionally, the UE may provide an indication (e.g., a third indication) to the NW that the previous flight path report (or flight path information) has been updated. The updated flight path information (or flight path report) may not be provided with the indication.

The UE could update the flight path report and/or transmit updated flight path information to the NW. The UE may transmit a (updated) flight path report to the NW in RRC connection mode and/or RRC idle/inactive mode. The UE may transmit one or more (updated) flight path reports during a same RRC connection and/or in a same serving cell. The UE may transmit a (updated) flight path report with or without a NW request. The UE may transmit a (updated) flight path information (or flight path report) and/or the third indication (e.g., of flight path information updated and/or available) when the flight path is updated, e.g., when or if a first condition is fulfilled.

The UE may provide the third indication if the UE has updated flight path information (or report). The UE may provide the third indication if the UE has available the flight path information (or report). The UE may not provide the third indication if the UE does not have updated flight path information (or report) (even if the UE has available the flight path information (or report)).

In one example, the UE may indicate a flight path update (or available) to the NW and report the (updated) flight path in response to (or when/after) receiving a NW request. The UE may transmit a third indication to the NW when the flight path is updated (or available), e.g., when or if a first condition is fulfilled. In response to receiving the third indication, the NW may request the UE to report (updated) flight path information. The UE may receive a request message from NW. Upon, when, after, or in response to receiving the request message, the UE may transmit an (updated) flight path report.

In one example, the UE may indicate a flight path update (or available) to the NW and report the (updated) path without receiving the NW request (e.g., triggered by the UE, UE-based). The UE may transmit a third indication to the NW when the flight path is updated (or available), e.g., when or if a first condition is fulfilled. In response to or after transmitting the third indication, the UE may transmit a (updated) flight path report. The UE may not receive a request message from the NW. The UE may transmit the (updated) flight path report along with the third indication.

In one example, the UE may not indicate a flight path update (or available) to the NW and may report the (updated) path without receiving the NW request (e.g., triggered by the UE, UE-based). The UE may not transmit a third indication to the NW. The UE may not receive a request message from the NW. The UE may transmit a (updated) flight path report to the NW when the flight path is updated (or available), e.g., when or if a first condition is fulfilled.

The UE may transmit the third indication via a Medium Access Control (MAC) Control Element (CE), e.g., for the flight path report. The UE may transmit the third indication via a RRC signaling. The RRC signaling may be a RRC message to complete a RRC connection procedure, e.g., RRCSetupComplete, RRCResumeComplete, RRCReconfigurationComplete, RRCReestablishmentComplete. The RRC signaling may be a RRC message to initiate a RRC connection procedure, e.g., RRCResumeRequest, RRCSetupRequest. The RRC signaling may be a measurement report (e.g., MeasurementReport) and/or UE assistance information (e.g., UEAssistanceInformation). The third indication may be an indication and/or a parameter (e.g., flightPathInfoAvailable, flightPathInfoUpdateAvailable) in the RRC signaling. The UE may transmit the third indication of the flight path information/report available or update via a UE assistance information (e.g., UEAssistanceInformation). The third indication may be an indication of flight path available.

The NW may request the UE to report the flight path information by transmitting a request message (e.g., UEInformationRequest) and/or a configuration. The request message (e.g., UEInformationRequest) may comprise an indication of the flight path information request (e.g., flightPathInfoReq) and/or a configuration of the flight path report (e.g., FlightPathInfoReportConfig). The request message (e.g., UEInformationRequest) may not comprise the configuration of the flight path report (e.g., FlightPathInfoReportConfig).

The UE may transmit a flight path report via a MAC CE (e.g., for flight path report), a measurement report (e.g., MeasurementReport), an assistance information (e.g., UEAssistanceInformation) and/or a response message (e.g., UEInformationResponse). The flight path report may be an initial flight path report and/or an updated flight path report. The initial flight path report may be the first transmitted flight path report in a RRC connection. The updated flight path report may be the flight path report transmitted after the initial flight path report in the same RRC connection. The initial flight path report and the updated flight path report may be transmitted on the same serving cell or different serving cells in a RRC connection. The flight path report may comprise a number of waypoint(s) and/or time stamp (s). The flight path report may comprise a list of location information (e.g., LocationInfo, CommonLocationInfo, coarseLocationInfo) and time information (e.g., timestamp, AbsoluteTimeInfo, RelativeTimeInfo). The location information may be 3D locations (of the UE). The flight path report may comprise full flight path information and/or part of the flight path information. The UE may report up to a configured number of waypoints in the flight path report if flight path information is available at the UE. The flight path report may comprise time stamps per waypoint if configured in the request and if available at the UE.

The updated flight path report may comprise a self-contained flight path information, e.g., the content is not related to the previous report. The updated flight path report may include the flight path information that is updated but not including the flight path information that is kept the same (compared to the previous report). The updated flight path report may indicate the waypoint(s) that is updated (compared to the previous report). The updated flight path report may not include the waypoint(s) that is not updated (compared to the previous report).

The MAC CE for the flight path report would be generated or transmitted when a flight path is updated or available, e.g., when or if a first condition is fulfilled. The MAC CE for the flight path report would be generated or transmitted when there are available resources to transmit the flight path report. The flight path report may be transmitted during a Random Access (RA) procedure. The flight path report may be transmitted in Msg3, MSGA and/or msg5 (e.g., the subsequent transmission after a RA procedure). The flight path report may be transmitted when the UE is in RRC connected mode. The flight path report may be transmitted in dynamic UL resources. The MAC CE for flight path report may or may not trigger a SR if there are no UL resources to transmit the MAC CE for flight path report.

The UE may trigger, generate, and/or transmit a third indication and/or a flight path report (or update) based on (at least) the first condition. The UE may indicate and/or report a flight path report (or update) based on (at least) the first condition. The first condition for the flight path report (or update) may comprise at least one or more of following conditions:

Upon (or in response to) flight path information is available;

Upon (or in response to) entering (or accessing) a new cell, e.g., after serving cell change;

Upon (or in response to) establishing a new RRC connection;

Upon (or in response to) the height of the UE reaching a threshold, e.g., becomes above or no less than a height threshold, becomes below or no larger than a height threshold;

Upon (or in response to) receiving a NW request;

Upon (or in response to) expiry of a timer, e.g., periodic timer, prohibit timer, validity timer;

Upon (or in response to) receiving a configuration related to a flight path report;

Upon (or in response to) receiving a first indication to enable (UE-based) a flight path update report;

Upon (or in response to) receiving a configuration of triggering event;

Upon (or in response to) a triggering event being fulfilled;

Upon (or in response to) a measurement report is triggered;

Upon (or in response to) connecting to a cell of NTN; and/or

Upon (or in response to) receiving satellite information, e.g., SIB19, NTN-Config.

For example, the UE may indicate and/or report a flight path (update) report if, when, upon, or in response to changing a new serving cell, e.g., entering a new cell. The UE may enter a new cell via a RRC procedure. The UE may enter a new cell when a RRC procedure is completed. The UE may enter a new cell form idle/inactive mode to connected mode. The UE may enter a new cell by handover in connected mode. The RRC procedure may be initial access, RRC connection setup procedure, RRC connection resume procedure, RRC connection reestablishment procedure, and/ or RRC connection reconfiguration procedure. The UE may report the flight path (update) report if the serving cell is an NTN cell. The UE may report the flight path (update) report if the serving cell is a TN cell. The UE may not report the flight path (update) report if the serving cell is a TN cell.

For example, the UE may indicate and/or report a flight path (update) report if, when, upon, or in response to establishing a new RRC connection. The UE may establish a new RRC connection via a RRC procedure. The UE may establish a new RRC connection when a RRC procedure is completed. The RRC procedure may be initial access, RRC connection setup procedure, RRC connection resume procedure, and/or RRC connection reestablishment procedure. The UE may establish a new RRC connection form idle/ inactive mode to connected mode. The RRC connection may cross different serving cells, e.g., by handover. The RRC connection may serve more than one cell and/or Next Generation Node B (gNB).

For example, the UE may indicate and/or report a flight path (update) report if, when, upon, or in response to the height (or altitude) of the UE reaches a first threshold (e.g., heightUE), e.g., below, above, or equal to the first threshold. The first threshold may be an (reference) altitude threshold. The first threshold may be a height threshold. The first threshold may indicate height of the UE in meters relative to the sea level. The first threshold may indicate that the UE reaches the altitude to link to the NW. The first threshold may indicate that the UE reaches the altitude for flying. The first threshold may indicate that the UE reaches the altitude to determine and/or report flight path. The first threshold may be used for both a height-based report and a flight path report. The first threshold may be used for the flight path report, but not used for the height-based report. The threshold used for the flight path report may be different form the threshold used for the height-based report. The threshold used for the flight path report may be same as the threshold used for the height based report.

For example, the UE may indicate and/or report a flight path (update) report if, when, upon, or in response to receiving a NW request. The UE may receive a request message (e.g., UEInformationRequest) to report flight path information.

For example, the UE may indicate and/or report a flight path (update) report if, when, upon, or in response to receiving a configuration related to the flight path report. The configuration may be a configuration described herein in the disclosure. The configuration may be a first configuration and/or a second configuration. The configuration may be a first indication to enable (UE-based) flight path update report. The configuration may be a configuration of a triggering event. The configuration may be a distance threshold, e.g., of the triggering event. The UE may indicate and/or report a flight path (update) report in response to the triggering event being fulfilled.

For example, the UE may indicate and/or report a flight path (update) report if, when, upon, or in response to a measurement report is triggered. The UE may receive a configuration of a measurement report (e.g., ReportConfigNR). The measurement report may be triggered based on radio condition (e.g., based on Event A1, Event A2, Event A3, Event A4, Event A5, Event A6 in [4] 3GPP TS 38.331 V17.2.0, "NR, RRC protocol specification". The measurement report may be triggered based on UE location and/or distance (e.g., based on Event D1 in [4] 3GPP TS 38.331 V17.2.0). The measurement report may be triggered based on time (e.g., based on CondEvent T1 in [4] 3GPP TS 38.331 V17.2.0). The measurement report may be triggered based on height (e.g., based on Event H1, Event H2 in [3] 3GPP TS 36.331 V17.2.0). The measurement report may comprise measured results of radio condition (e.g., of serving cell, of neighbor cell), UE location, and/or flight path report.

For example, the UE may indicate and/or report a flight path (update) report if the UE is linked to an NTN cell. The UE may indicate and/or report a flight path (update) report if one of the neighbor cells is a cell of NTN. The UE may indicate and/or report a flight path (update) report if the UE is capable to link to NTN. The UE may indicate and/or report a flight path (update) report if the UE is configured with satellite information. The UE may indicate and/or report a flight path (update) report if the UE has valid satellite information. The satellite information may be or may comprise SIB19 and/or NTN-Config in [4] 3GPP TS 38.331 V17.2.0. The satellite information may be considered as valid if a timer T430 is running For example, the UE may indicate and/or report a flight path (update) report periodically. The flight path report (or update) may be triggered when, upon, or in response to expiry of a periodic timer. The timer may be a periodic timer. The timer may indicate the periodicity of flight path (update) report.

For example, the UE may not be allowed to indicate and/or report a flight path (update) report within a duration, e.g., when a prohibit timer is running. To prevent from a too frequent flight path report (or update), a prohibit timer may be provided or configured to avoid the NW frequently requesting the flight path report or UE-based flight path report. The prohibit timer may be started (or restarted) upon (or in response to) the UE transmitting a flight path report (or update). If the prohibit timer is running, the UE may not be allowed to provide a flight path report (or update). If the prohibit timer is running, the UE may not be allowed to trigger a flight path report (or update) by itself. If the prohibit timer is running, the UE may not be allowed to transmit a UE-based flight path report (or update). If the prohibit timer is running, the UE may be allowed to transmit a NW requested flight path report (or update), e.g., upon or in response to the NW request. The UE may indicate and/or report a flight path (update) report when, upon, or in response to expiry of the prohibit timer, e.g., if there is an update to be reported. The timer may indicate the prohibit duration for flight path (update) report.

For example, the UE may indicate and/or report a flight path (update) report when, upon, or in response to expiry of a validity timer. The timer may indicate the validity or guaranty duration of a flight path report. The flight path report may be considered as valid when the related timer is running The timer (e.g., the periodic timer, the prohibit timer, the validity timer) may be configured by the NW. The value of the timer (e.g., the periodic timer, the prohibit timer, the validity timer) may be provided by the UE. The (length of the) timer (e.g., the periodic timer, the prohibit timer, the validity timer) may be related to the configuration of a flight path report and/or a measurement report. The NW may not request a flight path report when the timer is running. The UE may not report or update a (UE-based) flight path report when the timer is running. The UE may report or update a (NW requested) flight path report when the timer is running. The UE may start or restart the timer when a flight path report is triggered, generated, and/or transmitted. The UE may start or restart the timer when a flight path report is request by the NW. The NW may start or restart the timer when a flight path report is received.

The UE may indicate and/or report a flight path (update) report when, upon, or in response to a triggering event being fulfilled. The UE may indicate a flight path update or may be available when, upon, or in response to a triggering event being fulfilled. The triggering event may be based on the difference between a current (or expected/planned/updated) flight path and a last (or previously) reported flight path (e.g., for current serving cell, for current RRC connection). The current flight path may be the latest flight path that the UE plans or expects to use. The current flight path may be an updated flight path after the UE transmits the last (or previous) flight path and/or the UE changes/modifies the flight path.

The triggering event may be (at least) one or more of the following:

The distance difference of a waypoint (e.g., next waypoint, any waypoint in UE's flight path) reaching a distance threshold, e.g., distance difference between (location for) a (single) waypoint in the current flight path and the (location for) corresponding waypoint in the last reported and/or previously provided flight path is above or equal to a distance threshold, distance difference between previously provided location and new location for a waypoint is above or equal to a distance threshold;

The distance difference of a number of waypoints reaching a distance threshold, e.g., distance difference between waypoints in the current flight path and the corresponding waypoints in the last reported and/or previously provided flight path is above or equal to a distance threshold;

The sum of the distance difference of waypoints reaching a distance threshold, e.g., the sum of the distance difference between each waypoint in the current flight path and the corresponding waypoint in the last reported and/or previously provided flight path is above or equal to a distance threshold;

The height of the UE is changed, e.g., above or equal to a height threshold (e.g., first threshold);

The direction of the UE is changed;

The angle of the UE is changed, e.g., above or equal to an angle threshold;

The velocity of the UE is changed, e.g., above or equal to a velocity threshold; and/or The distance difference between the current UE location and the location where the last (or previous) flight path report is transmitted is above or equal to a distance threshold.

The UE may trigger an indication of flight path report update (e.g., the third indication) if an event is fulfilled. The UE may transmit the indication of flight path report update (e.g., the third indication) if the event is fulfilled. The event may be that distance difference between a waypoint in the current flight path (e.g., second flight path, undated flight path) and the corresponding waypoint in the last reported and/or previously provided flight path (e.g., first flight path, initial flight path) is above or equal to a distance threshold. After transmitting the third indication, the UE may receive a UE information request indicating flight path reporting and transmit an (updated) flight path report (e.g., comprise the second flight path) via a UE information response.

Figure 9:
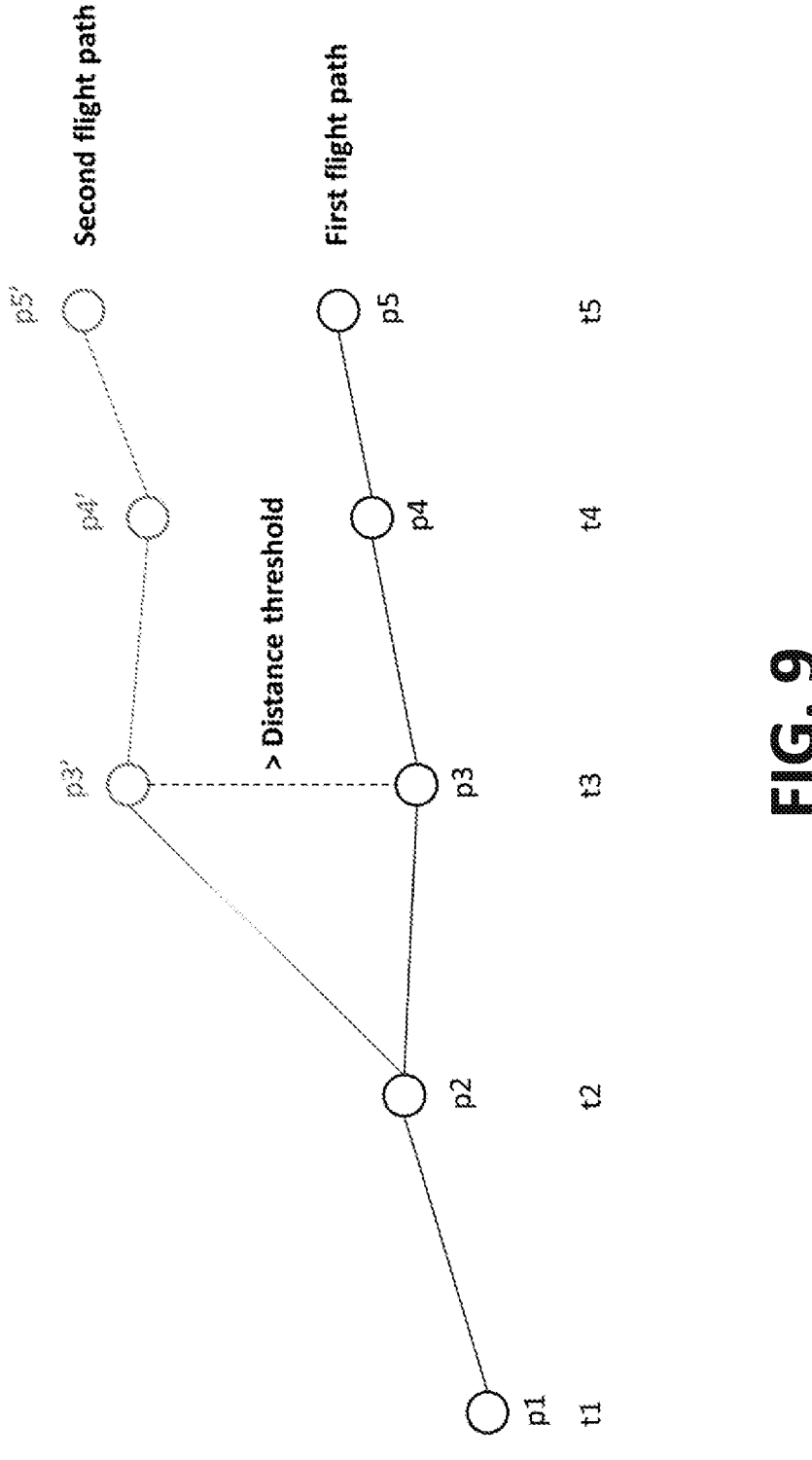
FIG. 9 is an example diagram showing triggering flight path update indication, in accordance with embodiments of the present invention.

In one example, as shown in FIG. 9, the UE may transmit a first flight path report at timing t0, e.g., based on a NW request. The first flight report may comprise a list of waypoints (e.g., WayPointLocation) with corresponding locations (e.g., LocationInfo) and/or time stamps (e.g., AbsoluteTimeInfo), e.g., a waypoint p1 at a timing t1, a waypoint p2 at a timing t2, a waypoint p3 at a timing t3, a waypoint p4 at a timing t4 and a waypoint p5 at a timing t5. The first flight report may comprise (at least) a first location (e.g., LocationInfo) corresponding to the timing t1 (e.g., AbsoluteTimeInfo), a second location (e.g., LocationInfo) corresponding to the timing t2 (e.g., AbsoluteTimeInfo), a third location (e.g., LocationInfo) corresponding to the timing t3 (e.g., AbsoluteTimeInfo) a fourth location (e.g., LocationInfo) corresponding to the timing t4 (e.g., AbsoluteTimeInfo), and/or a fifth location (e.g., LocationInfo) corresponding to the timing t5 (e.g., AbsoluteTimeInfo) in a first flight path. At (or after) timing t2, the UE may change its flight path as a second flight path. The distance between location (e.g., LocationInfo) of timing t3 in the current flight plan (e.g., a waypoint p3') and the third location (e.g., LocationInfo) of timing t3 in the first flight path report (e.g., the waypoint p3) may be larger than (or equal to) a distance threshold. In response to determining that the distance difference between the location in the current flight path (e.g., second flight path) and in the last reported and/or previously provided flight path (e.g., the first flight path, in the first flight path report) corresponding to the same time stamp (e.g., timing t3), the UE may trigger, update, generate, and/or transmit a second flight path report. In response to determining that the distance between the last reported and/or previously provided location for one waypoint (e.g. the third location for the waypoint p3) in the first flight path (report) and new location for the waypoint (e.g. the location for the waypoint p3') in the current flight path (e.g., second flight path), e.g., corresponding to the same time stamp (e.g., timing t3), is above or equal to the distance threshold, the UE may trigger, update, generate, and/or transmit a second flight path report. The second flight report may comprise a list of waypoints (e.g., WayPointLocation) with corresponding locations (e.g., LocationInfo) and/or time stamps (e.g., AbsoluteTimeInfo), e.g., the waypoint p3' at the timing t3, a waypoint p4' at the timing t4 and a waypoint p5' at the timing t5. In response to determining that the distance difference between the location of/for a waypoint in the current flight path (e.g., second flight path) and in the last reported and/or previously provided flight path (e.g., the first flight path) corresponding to the same time stamp (e.g., timing t3), the UE may trigger and/or transmit the third indication. In response to determining that the distance between the last reported and/or previously provided location for one waypoint in the first flight path (report) and new location for the waypoint (e.g., in current/updated/planned flight path, in the second flight path) is above or equal to the distance threshold, the UE may trigger and/or transmit the third indication. In response to receiving a UE information request, the UE may transmit the second flight path report via a UE information response. The first flight path report and/or the second flight path report may comprise time stamps (e.g., AbsoluteTimeInfo). The first flight path report and/or the second flight path report may not comprise time stamps (e.g., AbsoluteTimeInfo).

In one example, the UE may transmit a first flight path report, to a network node, comprising multiple waypoints. Each waypoint in the first flight path report may correspond to a time information (e.g., time stamp). The first flight path report may comprise the multiple waypoints with corresponding time stamps. The first flight path report may comprise the multiple waypoints without corresponding time stamps. The UE may receive a first configuration of a distance threshold for flight path reporting. The first configuration may enable a flight path report updating of the UE. The UE may transmit an indication of the flight path available (e.g., a third indication), to the network node, via a UE assistance information, if (at least) distance difference between a (single) waypoint in an available flight path (e.g., a current flight path, an updated flight path) and corresponding waypoint in the first flight path (report) is above or equal to the distance threshold. The corresponding waypoint in the first flight path (report) and the waypoint in the available flight path may be associated with the same time information. The time information may be a time stamp. The UE may receive a UE information request indicating flight path reporting. In response to receiving the UE information request, the UE may transmit a second flight path report via a UE information response. The second flight path report may comprise the available flight path (e.g., the current flight path, the updated flight path). The second flight path report may comprise another/other multiple waypoints with corresponding time stamps. The second flight path report may comprise at least a waypoint updated after the last or previously flight path reporting. The second flight path report may comprise the another/other multiple waypoints without corresponding time stamps. The first flight path report may be transmitted on a first serving cell. The second flight path report may be transmitted on a second serving cell. The available flight path may be a flight path of the UE when the UE is in the second serving cell. The available flight path may be a current, planned, and/or updated flight path after the UE transmits the first flight path report. The UE may perform a handover procedure to the second serving cell, e.g., after transmitting the first flight path report.

In one example, the UE may transmit a first indication of flight path available in a RRC (complete) message on a first serving cell. The UE may receive a first UE information request indicating flight path reporting. In response to receiving the first UE information request, the UE may transmit a first flight path report via a first UE information response on the first serving cell. The first flight path report may be an initial flight path report. The UE may perform a handover procedure to a second serving cell. The UE may determine that distance difference between a (single) waypoint in the current flight path (e.g., a new, updated, or latest flight path) and the corresponding waypoint in the first flight path (report) is above or equal to a distance threshold, e.g., when the UE is in a second serving cell or after the UE performs a handover procedure to the second serving cell. The UE may transmit a second indication of flight path available via a UE assistance information on the second serving cell, in response to that the distance difference between the waypoint in the current flight path and the corresponding waypoint in the first flight path (report) is above or equal to the distance threshold. The UE may receive a second UE information request indicating flight path reporting. In response to receiving the second UE information request, the UE may transmit a second flight path report via a second UE information response on the second serving cell. The second flight path report may be an updated flight path report.

In one example, a UE capable of updating a flight path repot may initiate a procedure of UE assistance information (transmission), e.g., for indicating flight path available/update, if it was configured to do so, and/or upon change of the (planned/expected) flight path. The UE assistance information may not include the updated flight path. The UE assistance information may not include a flight path report.

In one example, at timing t0, the UE may transmit a first flight path report. The first flight report may comprise a list of waypoints (e.g., WayPointLocation) with corresponding locations (e.g., LocationInfo) and time stamps (e.g., AbsoluteTimeInfo). The first flight report may comprise (at least) a first location (e.g., LocationInfo) corresponding to a timing t1 (e.g., AbsoluteTimeInfo), a second location (e.g., LocationInfo) corresponding to a timing t2 (e.g., AbsoluteTimeInfo), a third location (e.g., LocationInfo) corresponding to a timing t3 (e.g., AbsoluteTimeInfo) and a fourth location (e.g., LocationInfo) corresponding to a timing t4 (e.g., AbsoluteTimeInfo). At (or after) timing t2, the UE may change its flight path. The distance between location (e.g., LocationInfo) of timing t3 in current flight plan and the third location (e.g., LocationInfo) of timing t3 in the first flight path report may larger than (or equal to) a distance threshold. The distance between location (e.g., LocationInfo) of timing t4 in current flight plan and the fourth location (e.g., LocationInfo) of timing t4 in the first flight path report may larger than (or equal to) the distance threshold. There may be two waypoints reach the distance threshold. In response to determining that a number of waypoints (e.g., is equal or larger than a configured threshold) that fulfill (or reach) the distance threshold, the UE may trigger, update, generate, and/or transmit a second flight path report.

In one example, at timing t0, the UE may transmit a first flight path report. The first flight report may comprise a list of waypoints (e.g., WayPointLocation) with corresponding locations (e.g., LocationInfo) and time stamps (e.g., AbsoluteTimeInfo). The first flight report may comprise (at least) a first location (e.g., LocationInfo) corresponding to a timing t1 (e.g., AbsoluteTimeInfo), a second location (e.g., LocationInfo) corresponding to a timing t2 (e.g., AbsoluteTimeInfo), a third location (e.g., LocationInfo) corresponding to a timing t3 (e.g., AbsoluteTimeInfo) and a fourth location (e.g., LocationInfo) corresponding to a timing t4 (e.g., AbsoluteTimeInfo). At (or after) timing t2, the UE may change its flight path. The distance between location (e.g., LocationInfo) of timing t3 in current flight plan and the third location (e.g., LocationInfo) of timing t3 in the first flight path report plus the distance between location (e.g., LocationInfo) of timing t4 in current flight plan and the fourth location (e.g., LocationInfo) of timing t4 in the first flight path report may larger than (or equal to) the distance threshold. In response to determining that the sum of distance difference of waypoints that fulfill (or reach) the distance threshold, the UE may trigger, update, generate, and/or transmit a second flight path report.

In one example, when the UE reaches an (configured) altitude threshold, the UE may trigger, update, generate, and/or transmit a flight path report. When the UE reaches the (configured) altitude threshold, the altitude of the UE may be higher, lower, or equal to the (configured) altitude threshold.

In one example, at timing t0, the UE may transmit (or trigger, generate) a first flight path report. At (or after) timing t1, the distance difference between the current UE location and the UE location when the UE transmits the first flight path report (e.g., at or after timing t0) may be larger than (or equal to) a distance threshold. In response to determining that the distance difference between the current UE location and the UE location when the last reported and/or previously provided flight path (e.g., the first flight path report) is transmitted (or triggered, generated), the UE may trigger, update, generate, and/or transmit a second flight path report.

The NW could provide (at least some) configuration(s) related to the flight path report (e.g., UE-based flight path report) in a message other than the message to request a flight path report. For example, the configuration could be provided in a system information, RRC reconfiguration message, and/or a Physical Downlink Control Channel (PDCCH) signaling (e.g., Downlink Control Information (DCI)). The configuration may be applied to a UE-based flight path report. The configuration may be applied to the NW requested flight path report. The configuration may not be applied to the NW requested flight path report.

The NW may configure and/or provide configuration(s) (and/or parameters) related to a flight path report for a UE. The UE may be configured with and/or receive configuration(s) (and/or parameters) related to the flight path report. The configuration may be or comprise one or more parameters. The UE may receive the configuration(s) related to the flight path report in RRC inactive mode, RRC idle mode, and/or RRC connected mode.

The UE may receive the configuration(s) related to the flight path report in one or more of the following:

A request message (e.g., UEInformationRequest) of the flight path report;

A system information (e.g., System Information Block (SIB));

A RRC message (e.g., RRCSetup, RRCResume, RRCReconfiguration);

A MAC CE; and/or

A PHY signaling (e.g., PDCCH signaling, DCI).

The configuration may be applied to multiple flight path reports. The configuration may be applied to (all) the following flight path report, e.g., until being reconfigured. For example, the configuration provided in system information may be applied to (all) flight path reports. The configuration provided in system information may be applied to (all) UE-based flight path report.

The configuration may be applied to (only) the next flight path report. For example, the configuration provided in a request message may be (only) applied to the flight path report in the response message (and not applied to the other flight path report).

The configuration related to the flight path report may be a RRC configuration (e.g., FlightPathInfoReportConfig) and/or an indication. The configuration related to the flight path report may comprise at least one of the following:

A first indication of (UE-based) flight path report;

A configured number of waypoints;

A second indication of time stamp;

A first condition for flight path report (update); and/or

A timer or time duration for flight path report.

The first indication may indicate whether the UE is allowed to report flight path (or update flight path), (e.g., autonomously, without NW request, when or if a first condition is fulfilled). The first indication may enable or disable the UE-based flight path report. The first indication may be a Boolean value. The first indication may be optionally configured.

The configured number of waypoints may indicate the maximum number (or threshold) of waypoints that the UE could report and/or update in a flight path report. The UE may receive a first configured number of waypoints (e.g., maxWayPointNumber) indicating the maximum number (or threshold) of waypoints that the UE could report and/or update. The UE may receive a second configured number of waypoints (e.g., updated WayPointNumber) indicating the maximum number (or threshold) of waypoints that the UE could update.

The second indication (e.g., includeTimeStamp) may indicate whether the UE is allowed to report, include, and/or provide time stamp in the flight path report. The second indication may enable or disable time stamp reporting in the flight path report. The second indication may be a Boolean value. The second indication may be optionally configured.

The first condition may be or comprise one or more events, conditions, configurations, parameters, and/or thresholds for the UE to trigger a flight path (update) report. The UE may trigger, generate, and/or transmit a third indication and/or flight path report when (or if) the first condition is fulfilled. The configuration for the first condition may comprise (at least) a timer (e.g., periodic timer, prohibit timer, validity timer), a triggering event, a distance threshold, a first threshold (e.g., height threshold, altitude threshold), an angle threshold, and/or a velocity threshold.

For example, the timer may be a periodic timer, a prohibit timer, and/or a validity timer. The time duration (of the timer) may be a time period that the UE may not update, trigger, generate, and/or transmit a flight path report. The time duration (of the timer) may be a time period for the UE to update the flight path report.

The configuration related to the flight path report may be provided in multiple signaling, e.g., more than one signaling. The UE may receive a first configuration related to the flight path report in a first signaling. The UE may receive a second configuration related to the flight path report in a second signaling. The first configuration and/or the second configuration may be one or more of configurations in the disclosure herein, e.g., as described above. The first signaling may be a request message (e.g., UEInformationRequest), system information (e.g., SIB), a RRC message (e.g., RRCSetup, RRCResume, RRCReconfiguration), a MAC CE and/or a DCI. The second signaling may be a request message (e.g., UEInformationRequest), system information (e.g., SIB), a RRC message (e.g., RRCSetup, RRCResume, RRCReconfiguration), a MAC CE and/or a DCI. The first signaling and the second signaling may be different signaling. The configurations of the flight path report may be dedicated to a UE. The configurations of the flight path report may be common to the UEs in the same cell.

The first configuration (or signaling) may be applied to the NW requested flight path report. The first configuration (or signaling) may not be applied to a UE-based flight path report. The second configuration (or signaling) may be applied to a UE-based flight path report. The second configuration (or signaling) may not be applied to the NW requested flight path report. The first configuration (or signaling) may be applied to (all) the flight path report, e.g., both NW requested and UE-based. The second configuration (or signaling) may be applied to (all) the flight path report, e.g., both NW requested and UE-based.

The UE may report (or update) the flight path and/or perform the flight path reporting (or update) based on the configuration(s) (e.g., the first configuration and/or the second configuration). The UE may report (or update) the flight path and/or perform the flight path reporting (or update)

according to a configuration and/or parameter not included in the request message (e.g., UEInformationRequest).

The UE may report (up to) a number of waypoints in a flight path report according to (at least) one of the following:

A pre-defined number of waypoints;

The (pre-defined) maximum number of the configured number of waypoints;

The configured number of waypoints received in the first signaling; and/or

The configured number of waypoints received in the second signaling.

For example, the pre-defined number of waypoints may be a fixed number, e.g., defined in the MAC specification or the RRC specification. The pre-defined number of waypoints may be an integer less than (or equal to) the (pre-defined) maximum number of the configured number of waypoints. The UE may report the pre-defined number of waypoints for the UE-based flight path report. The UE may report the pre-defined number of waypoints if the configured number of waypoints is not received.

For example, the (pre-defined) maximum number of the configured number of waypoints may be a fixed number, e.g., defined in the RRC specification. The (pre-defined) maximum number of the configured number of waypoints may be a parameter (e.g., maxWayPoint) with value configured as an integer. The UE may report the (pre-defined) maximum number of the configured number of waypoints for the UE-based flight path report. The UE may report the (pre-defined) maximum number of the configured number of waypoints if the configured number of waypoints is not received.

For example, the configured number of waypoints received in the first signaling or in the second signaling may be an integer among 1 to the (pre-defined) maximum number of the configured number of waypoints. The UE may report the configured number of waypoints received in the second signaling for the UE-based flight path report. The UE may report the configured number of waypoints received in the first signaling for the NW requested flight path report. The UE may report the configured number of waypoints received in the second signaling if the configured number of waypoints is not received in the first signaling. The UE may report the configured number of waypoints received in the first signaling if the configured number of waypoints is not received in the second signaling.

In one example, the UE may receive a first signaling to request a flight path report. The first signaling may indicate (or configure) a first configured number of waypoints. In response to receiving the first signaling, the UE may transmit a first flight path report comprising up to the first configured number of waypoints. The UE may receive a second signaling to configure the flight path report update (or UE-based flight path report). The second signaling may be received before receiving the first signaling or transmitting the first flight path report. The second signaling may be received after receiving the first signaling or transmitting the first flight path report. The second signaling may indicate (or configure) a triggering event for a flight path report update (or UE-based flight path report). The second signaling may indicate (or configure) a second configured number of waypoints. The second signaling may not indicate (or configure) a second configured number of waypoints. The UE may transmit a second flight path report based on the triggering event. The UE may include up to the first configured number of waypoints in the second flight path report. The UE may include up to the second configured number of waypoints in the second flight path report. The UE may not include up to the second configured number of waypoints in the second flight path report. The UE may include up to the first configured number of waypoints in the second flight path report, if the second configured number of waypoints is not received. The UE may include up to the first configured number of waypoints in the second flight path report, if the first flight path report has been transmitted. The UE may include up to the second configured number of waypoints in the second flight path report, if the second configured number of waypoints is received. The UE may include up to the second configured number of waypoints in the second flight path report, if the first flight path report has not been transmitted. The UE may determine the (maximum) number of waypoints in a flight path report (update) (e.g., the second flight path report) based on the last and/or previously transmitted flight path report (e.g., the first flight path report). The UE may determine the (maximum) number of waypoints in a UE-based flight path report (e.g., the second flight path report) based on the NW requested flight path report (e.g., the first flight path report). The UE may report a number of waypoints in a flight path report (update) same as the number of waypoints in the last and/or previously transmitted flight path report and/or the NW requested flight path report. The UE may report up to a maximum number of waypoints in a flight path report (update) same as the number of waypoints in the last and/or previously transmitted flight path report and/or the NW requested flight path report. Each waypoint may relate to a location information (e.g., LocationInfo) and/or a time stamp (e.g., AbsoluteTimeInfo).

The UE may determine whether to report time stamp in a flight path report according to (at least) one of the following:

Considering the second indication as true;

Whether reporting time stamp in the last (or previous) flight path report;

The second indication received in the first signaling; and/or

The second indication received in the second signaling.

For example, the UE may (always) report time stamp in the flight path report (e.g., triggered by the UE, UE-based flight path report). The UE may (always) report time stamp in the flight path report if the first indication enables a (UE-based) flight path report. The UE may (always) report time stamp in the flight path report for the UE-based flight path report. The UE may (always) report time stamp in the flight path report for the NW requested flight path report. The UE may not (always) report time stamp in the flight path report for the NW requested flight path report. The UE may consider the second indication as true if the first indication enables a (UE-based) flight path report. The UE may consider the second indication as true if the second indication is not configured. The NW may not provide the second indication in NR. The NW may not provide the second indication in NTN. The NW may provide the second indication in TN. The UE may determine to report time stamp in the flight path report in NR. The UE may determine whether to report time stamp in the flight path report based on the second indication in LTE. The UE may determine to report time stamp in the flight path report in NTN. The UE may determine whether to report time stamp in the flight path report based on the second indication in TN.

For example, the UE may report time stamp in the flight path report if the time stamp is reported in the last flight path report. The UE may not report time stamp in the flight path report if the time stamp is not reported in the last flight path report. The UE may report time stamp in the UE-based flight path report if the time stamp is reported in the NW requested flight path report. The UE may not report time stamp in the UE-based flight path report if the time stamp is not reported in the NW requested flight path report.

For example, the UE may report time stamp in the flight path report for the UE-based flight path report based on the second indication received in the second signaling. The UE may report time stamp in the flight path report for the UE-based flight path report based on the second indication received in the second signaling if the second indication is not received in the first signaling. The UE may report time stamp in the flight path report for the NW requested flight path report based on the second indication received in the first signaling. The UE may report time stamp in the flight path report for the UE-based flight path report based on the second indication received in the first signaling.

On the other hand, based on the current procedure of the flight path report, the configuration for the NW requested flight path report is provided in the request message of the flight path report. If the configuration for a flight path report could be provided somewhere else, as described above, e.g., for the UE-based flight path report, there could be a unified way of providing configuration for the flight path report.

The configuration for the NW requested flight path report could follow the configuration for the UE-based flight path report (or general flight path report). The configuration for the general flight path report may be applied to (all) the flight path report, e.g., both the NW requested and UE-based. The configuration for the NW requested flight path report could be optional in a request message of the NW requested flight path report.

For example, if a first configuration for the UE-based flight path report (or general flight path report) has been provided to the UE (e.g., in system information, in RRC reconfiguration), a request message of the flight path report (e.g., NW requested flight path report) may not provide a second configuration for the flight path report. The UE applies the first configuration for the flight path report in response to the request. The configuration for the flight path report (e.g., the second configuration) could be optional (and/or omitted) in the request message of the flight path report (e.g., NW requested flight path report). The UE provides a flight path report (in response to the request) based on the first configuration.

Alternatively or additionally, a second configuration of the flight path report may overwrite a first configuration of the flight path report. For example, if a first configuration for the flight path report (e.g., for the general flight path report, for the UE-based flight path report) has been provided to the UE (e.g., in system information, in RRC reconfiguration), a second configuration of the flight path report (e.g., provided in the request message of the flight path report) could overwrite the first configuration of the flight path report. The UE provides a flight path report (in response to the request) based on the second configuration.

The second configuration may be applied to (all) the following flight path report (e.g., a UE-based flight path report). The second configuration may be used to reconfigure the first configuration. The second configuration may not be applied to (all) the following flight path report (e.g., a UE-based flight path report). The second configuration may be a one-shot configuration, e.g., not to reconfigure the first configuration.

The NW may transfer the configuration(s) and/or received flight path report(s) from source cell/gNB to target cell/gNB, e.g., upon handover preparation. The source cell/gNB and target cell/gNB in the same RRC connection may share a flight path report. For example, the UE may transmit a first flight path report (e.g., an initial flight path report) in a first serving cell. After transmitting the flight path report, the UE may handover to a second serving cell. The NW may transfer the flight path report from the first serving cell to the second serving cell. The UE may report a second flight path report (e.g., an updated flight path report) in the second serving cell based on the first path report.

The UE may be allowed to provide (or trigger) a flight path report (or update), e.g., UE-based flight path report, if the UE has provided a flight path report based on a NW request, e.g., in the same serving cell. The UE may not be allowed to provide (or trigger) a flight path report (or update), e.g., UE-based flight path report, if the UE has not provided a flight path report based on a NW request, e.g., in the same serving cell.

The UE may be allowed to provide (or trigger) a flight path report (or update), e.g., UE-based flight path report, if the UE has provided a flight path report based on a NW request, e.g., in the same RRC connection. The UE may not be allowed to provide (or trigger) a flight path report (or update), e.g., UE-based flight path report, if the UE has not provided a flight path report based on a NW request, e.g., in the same RRC connection. The UE may be allowed to provide (or trigger) a flight path report (or update), e.g., UE-based flight path report, (even) if the UE has not provided a flight path report based on a NW request in the same serving cell.

For example, the UE enters RRC_CONNECTED (e.g., from RRC_IDLE) in a first serving cell. The UE receives a request of a flight path report in the first serving cell and provides a first flight path report in the first serving cell. Before the UE receives the request and provides the first flight path report, the UE is not allowed to provide a flight path report (or update), e.g., UE-based flight path report (or update). After the UE receives the request and provides the first flight path report, the UE is allowed to provide a flight path report (or update), e.g., UE-based flight path report (or update). Then the UE changes its serving cell to a second serving cell (e.g., from the first serving cell), e.g., via handover. When the UE is in the second serving cell, the UE is allowed to provide a flight path report (or update), e.g., UE-based flight path report (or update), even if the UE has never received a request of flight path report and/or provided a flight path report (e.g., NW requested flight path report) in the second serving cell. Whether to trigger a (UE-based) flight path report (or update) may be compared with the last flight path report in the first serving cell. The UE may trigger and/or transmit the third indication in response to the distance difference between a waypoint in the current flight path when the UE is in the second serving cell and the corresponding waypoint in the last reported flight path in the first serving cell is above or equal to the distance threshold.

Throughout the disclosure, the flight path report may comprise a full flight path and/or part of a flight path. The UE may report all the available waypoints (in the future) in the flight path report.

The UE may report the updated waypoints among all the available waypoints (in the future) in the flight path report. Throughout the disclosure, a flight path report may comprise, be, or be referred to as a flight path.

Various combinations, in whole or in part, of the examples, concepts, aspects, and/or embodiments in the disclosure are possible.

Throughout the disclosure, the flight path report may be a UE-based flight path report and/or the flight path report requested by the NW. The flight path report may be a flight path update report. The flight path report may be an initiate flight path report and/or updated flight path report in a RRC connection. The flight path report may be an initiate flight path report and/or updated flight path report in a serving cell.

The flight path update (or updated flight path report) may be a flight path report (or information) that is updated compared to the previous (or last) flight path report transmitted by the UE. The flight path update (or updated flight path report) may be a flight path report (or information) that is updated, compared to the previous (or last) NW requested flight path report by the UE. The flight path update (or updated flight path report) may be a flight path report (or information) that is updated, compared to the previous (or last) UE-based flight path report by the UE.

The UE-based flight path report may be a flight path report without a NW request. The UE-based flight path report may be triggered by the UE. The UE-based flight path report may be an event-triggered flight path report. The UE-based flight path report may be a flight path report reported automatically by the UE. The UE may transmit the UE-based flight path report when the flight path is updated or available, e.g., when a first condition is fulfilled.

The NW requested flight path report may be a flight path report requested by NW. The UE may transmit the NW requested flight path report when receiving the NW request. The UE may transmit the NW requested flight path report in response to a request by the NW.

The UE may be, or referred to as, the UE, a MAC entity of the UE, a Hybrid Automatic Repeat Request (HARQ) entity of the UE, or a RRC entity of the UE.

The UE may be a NR device. The UE may be a NR-light device. The UE may be an LTE device. The UE may be a reduced capability device. The UE may be a mobile phone. The UE may be a wearable device. The UE may be a sensor. The UE may be a stationary device. The UE may be an aerial device. The UE may be a UAV device. The UE may be an aircraft, a balloon, a drone, and/or an ultralight vehicle.

The UE may be in a cell of a TN. The UE may be connected to a cell of a TN. The UE may be in a cell of an NTN. The UE may be connected to a cell of an NTN. The UE may be connected to a Low Earth Orbit (LEO), Geostationary Equatorial Orbit (GEO), Medium Earth Orbit (MEO), Highly Elliptical Orbit (HEO), and/or High-Altitude Platform Station (HAPS).

The UE may be capable of reporting and/or updating the flight path. The UE may be configured to report and/or update the flight path. The UE may receive a configuration to enable flight path reporting and/or flight path updating. The configuration may comprise a configured number of waypoints, an indication of whether to include time information in the flight path report, and/or one or more configured thresholds of triggering events of a flight path update.

The network may be a network node. The network may be a base station. The network may be an access point. The network may be an Evolved Node B (eNB). The network may be a gNB. The network may be a gateway.

Figure 10:
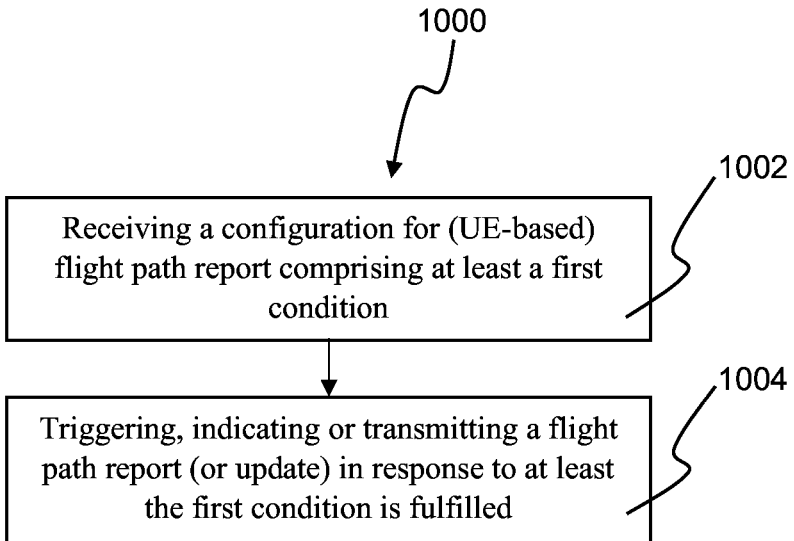
FIG. 10 is a flow diagram of a UE method comprising receiving a configuration for (UE-based) flight path report comprising at least a first condition, and triggering, indicating or transmitting a flight path report (or update) in response to at least the first condition is fulfilled, in accordance with embodiments of the present invention.

Referring to FIG. 10, with this and other concepts, systems, and methods of the present invention, a method 1000 for a UE in a wireless communication system comprises receiving a configuration for (UE-based) flight path report comprising at least a first condition (step 1002) and triggering, indicating or transmitting a flight path report (or update) in response to at least the first condition is fulfilled (step 1004).

In various embodiments, the first condition is based on the height of the UE.

In various embodiments, the first condition is based on the difference between the current flight path and the last reported (or previously provided) flight path.

In various embodiments, the first condition is based on the difference between the current location and the location where the last (or previous) flight path report is transmitted.

In various embodiments, the first condition is at least a configured threshold.

Referring back to FIGS. 3 and 4, in one or more embodiments from the perspective of a UE, the device 300 includes a program code 312 stored in memory 310 of the transmitter. The CPU 308 could execute program code 312 to: (i) receive a configuration for (UE-based) flight path report comprising at least a first condition; and (ii) trigger or transmit a flight path report (or update) in response to at least the first condition is fulfilled. Moreover, the CPU 308 can execute the program code 312 to perform all of the described actions, steps, and methods described above, below, or otherwise herein.

Referring back to FIGS. 3 and 4, in one or more embodiments from the perspective of a network, the device 300 includes a program code 312 stored in memory 310 of the transmitter. The CPU 308 could execute program code 312 to: (i) transmit, to a UE, a configuration for (UE-based) flight path report comprising at least a first condition; and (ii) trigger or transmit, by the UE, a flight path report (or update) in response to at least the first condition is fulfilled. Moreover, the CPU 308 can execute the program code 312 to perform all of the described actions, steps, and methods described above, below, or otherwise herein.

Figure 11:
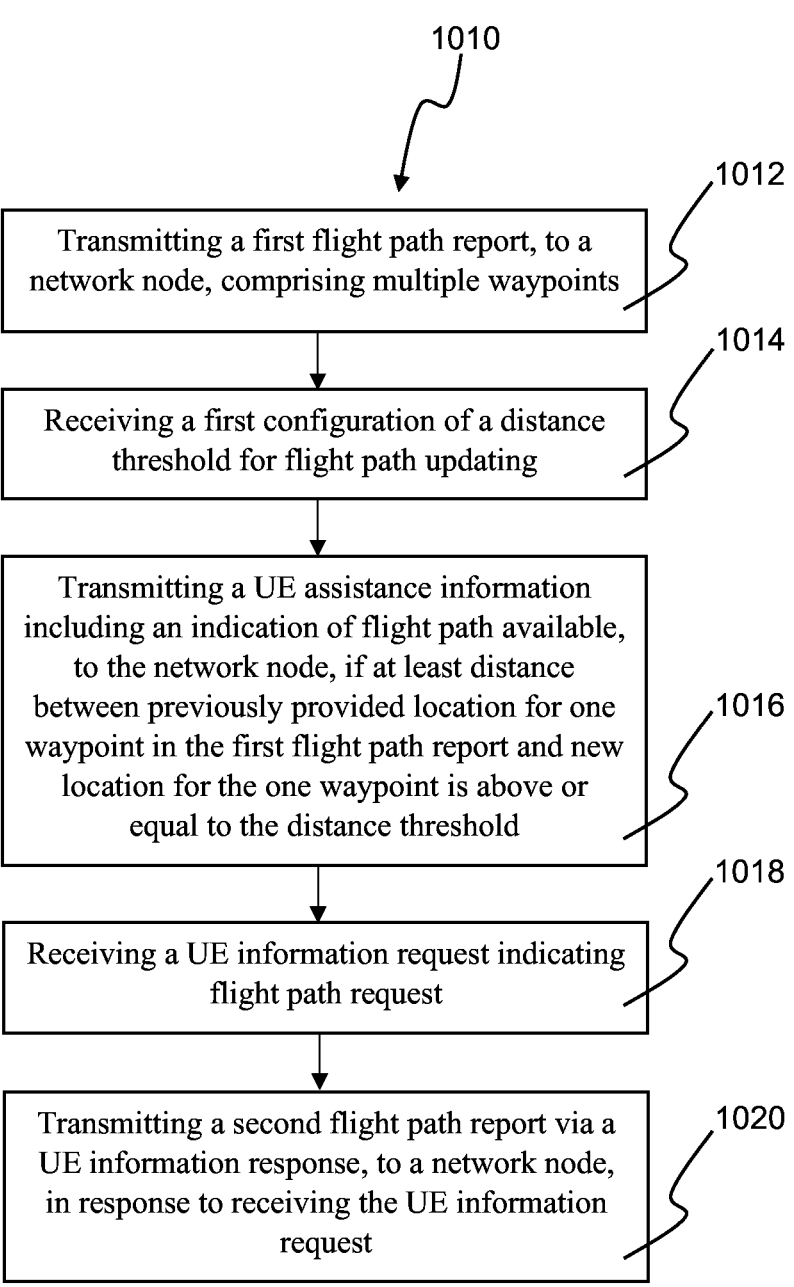
FIG. 11 is a flow diagram of a UE method comprising transmitting a first flight path report, to a network node, comprising multiple waypoints, receiving a first configuration of a distance threshold for flight path update, transmitting an indication of flight path available to the network node, receiving a UE information request indicating flight path reporting, and transmitting a second flight path report, in accordance with embodiments of the present invention.

Referring to FIG. 11, with this and other concepts, systems, and methods of the present invention, a method 1010 for a UE in a wireless communication system comprises transmitting a first flight path report, to a network node, comprising multiple waypoints (step 1012), receiving a first configuration of a distance threshold for flight path updating (step 1014), transmitting a UE assistance information including an indication of flight path available, to the network node, if at least distance between previously provided location for one waypoint in the first flight path report and new location for the one waypoint is more than or equal to the distance threshold (step 1016), receiving a UE information request indicating flight path request (step 1018), and transmitting a second flight path report via a UE information response, to a network node, in response to receiving the UE information request (step 1020).

In various embodiments, the UE transmits the UE assistance information including the indication of flight path available, if at least distance difference between a single waypoint in an current available flight path and corresponding waypoint in the first flight path report is above or equal to the distance threshold.

In various embodiments, the first configuration enables flight path report updating.

In various embodiments, the first configuration is received in a RRC reconfiguration message and/or the UE information request.

In various embodiments, the first configuration is comprised in a UAV configuration.

In various embodiments, the UE configures or reconfigures the first configuration in response to receiving the first configuration.

In various embodiments, the UAV configuration comprises UAV parameters including at least the first configuration of the distance threshold, a configured number of waypoints and/or an indication of including time stamp.

In various embodiments, the transmitting the UE assistance information is initiated in response to flight path available and/or availability of flight path information.

In various embodiments, the transmitting the UE assistance information is initiated to indicate the availability of flight path information.

In various embodiments, the UE assistance information may not include the updated flight path. The UE assistance information may not include a flight path report.

In various embodiments, the UE has flight path information available.

In various embodiments, the UE initiates or triggers a procedure of UE assistance information to inform the network of availability of flight path information.

In various embodiments, the UE includes the indication of flight path available in the UE assistance information if the procedure of UE assistance information is initiated to indicate the availability of flight path information.

In various embodiments, the UE receives a configuration to indicate the availability of flight path information for aerial UE operation and/or flight path reporting.

In various embodiments, the UE is configured with flight path availability.

In various embodiments, the UE is capable of aerial UE operation.

In various embodiments, the UE is capable of indicating flight path update.

In various embodiments, the UE is an aerial UE.

In various embodiments, the first flight path report is a last or previously reported/provided flight path report.

In various embodiments, the first flight path report comprises the last or previously reported/provided flight path.

In various embodiments, the available flight path is a current flight path of the UE.

In various embodiments, the available flight path is a planned and/or an updated flight path after the UE transmits the first flight path report.

In various embodiments, the second flight path report comprises the available flight path and/or comprises other multiple waypoints and/or comprises at least one waypoint updated after the last or previously flight path reporting.

In various embodiments, the first flight path report and/or the second flight path report comprises time stamps for each waypoint.

In various embodiments, the corresponding waypoint in the first flight path report and the waypoint in the available flight path are associated with a same time information, wherein the same time information is a time stamp.

In various embodiments, the new location of/for the one waypoint is a location of/for the corresponding waypoint in the available flight path, wherein the available flight path is a current or planned flight path of the UE after the UE transmits the first flight path report.

In various embodiments, the corresponding waypoint in the available flight path and the one waypoint in the first flight path report are associated with a same time information, wherein the same time information is a time stamp.

In various embodiments, the new location of/for the one waypoint is in a location of/for the one waypoint in the available flight path, wherein the one waypoint is previously provided in the first flight path report with a previously provided location.

In various embodiments, the waypoint comprises a location for the waypoint and/or a time stamp for the waypoint.

In various embodiments, the first flight path report is transmitted on a first serving cell and the second flight path report is transmitted on a second serving cell.

In various embodiments, the available flight path is a flight path of the UE when the UE is on a second serving cell.

In various embodiments, the first flight path report is transmitted if the UE has not previously provided a flight path.

In various embodiments, the first flight path report and/or second flight path report is transmitted if the UE has previously provided a flight path.

In various embodiments, the first flight path report comprise a first flight path (information), an initiate flight path (information) and/or an updated flight path (information).

In various embodiments, the second flight path report comprise a second flight path (information) and/or an updated flight path (information).

In various embodiments, the first flight path report includes a list of up to the configured number of waypoints and/or corresponding time stamp along a first flight path.

In various embodiments, the second flight path report includes a list of up to the configured number of waypoints and/or corresponding time stamp along a second flight path.

In various embodiments, the time stamp is the time when the UE intends to arrive to the waypoint.

In various embodiments, the UE information request includes an indication of flight path request, e.g. to indicate whether the UE can report flight path and/or indicate the UAV configuration.

In various embodiments, the indication of flight path available is set to true.

In various embodiments, the distance is a 3D distance.

In various embodiments, the method further comprises transmitting a first indication of flight path available in a RRC message on a first serving cell, receiving a first UE information request indicating flight path reporting, transmitting the first flight path report, via a first UE information response on a first serving cell, in response to receiving the first UE information request, performing a handover procedure to a second serving cell, determining distance difference between a waypoint in the available flight path and the corresponding waypoint in the first flight path report is above or equal to the distance threshold, when the UE is in the second serving cell or after the UE performs the handover procedure to the second serving cell, transmitting a second indication of flight path available, via a UE assistance information on the second serving cell, if at least distance difference between the waypoint in the available flight path and the corresponding waypoint in the first flight path report is above or equal to the distance threshold, receiving a second UE information request indicating flight path reporting, and/or transmitting the second flight path report, via a second UE information response on the second serving cell, in response to receiving the second UE information request.

In various embodiments, the method further comprises transmitting a RRC message including a first indication of flight path available on a first serving cell, receiving a first UE information request indicating flight path request, transmitting the first flight path report, via a first UE information response on a first serving cell, in response to receiving the first UE information request, performing a handover procedure to a second serving cell, determining whether distance between previously provided location for one waypoint in the first flight path report and new location for the one waypoint is more than or equal to the distance threshold, when the UE is in the second serving cell or after the UE performs the handover procedure to the second serving cell, transmitting the UE assistance information including a second indication of flight path available on the second serving cell, if at least the distance between the previously provided location for the one waypoint in the first flight path report and the new location for the one waypoint is more than or equal to the distance threshold, receiving a second UE information request indicating flight path request, and/or transmitting the second flight path report, via a second UE information response on the second serving cell, in response to receiving the second UE information request.

In various embodiments, the RRC message is RRCReestablishmentComplete, RRCReconfigurationComplete, RRCResumeComplete and/or RRCSetupComplete.

Referring back to FIGS. 3 and 4, in one or more embodiments from the perspective of a UE, the device 300 includes a program code 312 stored in memory 310 of the transmitter. The CPU 308 could execute program code 312 to: (i) transmit a first flight path report, to a network node, comprising multiple waypoints; (ii) receive a first configuration of a distance threshold for flight path updating; (iii) transmit a UE assistance information including an indication of flight path available to the network node, if at least distance between previously provided location for one waypoint in the first flight path report and new location for the one waypoint is more than or equal to the distance threshold; (iv) receive a UE information request indicating flight path request; and (v) transmit a second flight path report via a UE information response, to a network node, in response to receiving the UE information request. Moreover, the CPU 308 can execute the program code 312 to perform all of the described actions, steps, and methods described above, below, or otherwise herein.

Referring back to FIGS. 3 and 4, in one or more embodiments from the perspective of a network, the device 300 includes a program code 312 stored in memory 310 of the transmitter. The CPU 308 could execute program code 312 to: (i) receive a first flight path report, from a UE, comprising multiple waypoints; (ii) transmit a first configuration of a distance threshold for flight path updating; (iii) receive a UE assistance information including an indication of flight path available from the UE, if at least distance between previously received location for one waypoint in the first flight path report and new location for the one waypoint is more than or equal to the distance threshold; (iv) transmit a UE information request indicating flight path request; and (v) receive a second flight path report via a UE information response, from the UE, in response to transmitting the UE information request. Moreover, the CPU 308 can execute the program code 312 to perform all of the described actions, steps, and methods described above, below, or otherwise herein.

Any combination of the above concepts or teachings can be jointly combined or formed to a new embodiment. The disclosed details and embodiments can be used to solve at least (but not limited to) the issues mentioned above and herein.

It is noted that any of the methods, alternatives, steps, examples, and embodiments proposed herein may be applied independently, individually, and/or with multiple methods, alternatives, steps, examples, and embodiments combined together.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects, concurrent channels may be established based on pulse repetition frequencies. In some aspects, concurrent channels may be established based on pulse position or offsets. In some aspects, concurrent channels may be established based on time hopping sequences. In some aspects, concurrent channels may be established based on pulse repetition frequencies, pulse positions or offsets, and time hopping sequences.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of ordinary skill in the art would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects, any suitable computer-program product may comprise a computer-readable medium comprising codes relating to one or more of the aspects of the disclosure. In some aspects, a computer program product may comprise packaging materials.

While the invention has been described in connection with various aspects and examples, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:
1. A method for a User Equipment (UE), comprising:
transmitting a first flight path report, to a network node, comprising multiple waypoints;
receiving a first configuration of a distance threshold for flight path updating;
transmitting a UE assistance information including an indication of flight path available, to the network node, if at least a distance between a previously provided location for one waypoint in the first flight path report and a new location for a corresponding waypoint in an available flight path is more than or equal to the distance threshold, wherein the corresponding waypoint in the available flight path and the one waypoint in the first flight path report are associated with a time stamp;
receiving a UE information request indicating a flight path request; and
transmitting a second flight path report via a UE information response, to a network node, in response to receiving the UE information request.
2. The method of claim 1, wherein the transmitting the UE assistance information is initiated in response to flight path available, or wherein the UE assistance information does not include a flight path report.

3. The method of claim 1, wherein the first flight path report is a last or previously reported flight path report, or comprises a last or previously reported flight path report.
4. The method of claim 1, wherein the available flight path is a current or planned flight path of the UE after the UE transmits the first flight path report.
5. The method of claim 1, wherein the second flight path report comprises the available flight path, comprises other multiple waypoints, or comprises at least a waypoint updated after a last or previously reported flight path report.
6. The method of claim 1, wherein the one waypoint comprises a location for the one waypoint and a time stamp for the one waypoint.
7. The method of claim 1, wherein the first flight path report is transmitted on a first serving cell and the second flight path report is transmitted on a second serving cell.
8. The method of claim 1, wherein the available flight path is a flight path of the UE when the UE is on a second serving cell.
9. The method of claim 1, further comprising:
transmitting a Radio Resource Control (RRC) message including a first indication of flight path available on a first serving cell;
receiving a first UE information request indicating flight path request;
transmitting the first flight path report, via a first UE information response, on the first serving cell, in response to receiving the first UE information request;
performing a handover procedure to a second serving cell;
determining whether the distance between the previously provided location for the one waypoint in the first flight path report and a new location for the one waypoint is more than or equal to the distance threshold, when the UE is in the second serving cell, or after or in response to the UE performing the handover procedure to the second serving cell;
transmitting a second indication of flight path available on the second serving cell, if at least the distance between the previously provided location for the one waypoint in the first flight path report and the new location for the one waypoint is more than or equal to the distance threshold;
receiving a second UE information request indicating flight path request; and
transmitting the second flight path report, via a second UE information response on the second serving cell, in response to receiving the second UE information request.
10. A User Equipment (UE), comprising:
a memory; and
a processor operatively coupled to the memory, wherein the processor is configured to execute a program code to:
transmit a first flight path report, to a network node, comprising multiple waypoints;
receive a first configuration of a distance threshold for flight path updating;
transmit a UE assistance information an indication of flight path available, to the network node, if at least a distance between a previously provided location for one waypoint in the first flight path report and a new location for a corresponding waypoint in an available flight path is more than or equal to the distance threshold, wherein the corresponding waypoint in the available flight path and the one waypoint in the first flight path report are associated with a time stamp;

receive a UE information request indicating a flight path request; and transmit a second flight path report via a UE information response, to a network node, in response to receiving the UE information request.

11. The UE of claim 10, wherein the transmitting the UE assistance information is initiated in response to flight path available, or wherein the UE assistance information does not include a flight path report.

12. The UE of claim 10, wherein the first flight path report is a last or previously reported flight path report, or comprises a last or previously reported flight path report.

13. The UE of claim 10, wherein the available flight path is a current or planned flight path of the UE after the UE transmits the first flight path report.

14. The UE of claim 10, wherein the second flight path report comprises an available flight path, comprises other multiple waypoints, or comprises at least a waypoint updated after a last or previously reported flight path report.

15. The UE of claim 10, wherein the one waypoint comprises a location for the one waypoint and a time stamp for the one waypoint.

16. The UE of claim 10, wherein the first flight path report is transmitted on a first serving cell and the second flight path report is transmitted on a second serving cell.

17. The UE of claim 10, wherein the available flight path is a flight path of the UE when the UE is on a second serving cell.

18. The UE of claim 10, wherein the processor is further configured to execute the program code to:

transmit a Radio Resource Control (RRC) message including a first indication of flight path available on a first serving cell;

receive a first UE information request indicating flight path request;

transmit the first flight path report, via a first UE information response on the first serving cell, in response to receiving the first UE information request;

perform a handover procedure to a second serving cell;

determine whether the distance between the previously provided location for the one waypoint in the first flight path report and a new location for the one waypoint is more than or equal to the distance threshold, when the UE is in the second serving cell, or after or in response to the UE performing the handover procedure to the second serving cell;

transmit a second indication of flight path available on the second serving cell, if at least the distance between the previously provided location for the one waypoint in the first flight path report and the new location for the one waypoint is more than or equal to the distance threshold;

receive a second UE information request indicating flight path request; and transmit the second flight path report, via a second UE information response on the second serving cell, in response to receiving the second UE information request.

* * * * *